US009917877B2

(12) United States Patent
Adams et al.

(10) Patent No.: US 9,917,877 B2
(45) Date of Patent: Mar. 13, 2018

(54) STREAMING THE VISIBLE PARTS OF A SPHERICAL VIDEO

(71) Applicant: GOOGLE INC., Mountain View, CA (US)

(72) Inventors: Riley Adams, Seattle, WA (US); Jim Bankoski, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 303 days.

(21) Appl. No.: 14/518,710

(22) Filed: Oct. 20, 2014

(65) Prior Publication Data

US 2016/0112489 A1 Apr. 21, 2016

(51) Int. Cl.
| | |
|---|---|
| *H04N 7/12* | (2006.01) |
| *H04L 29/06* | (2006.01) |
| *G06T 9/00* | (2006.01) |
| *G06T 15/04* | (2011.01) |
| *H04N 19/597* | (2014.01) |
| *H04N 19/46* | (2014.01) |
| *H04N 19/154* | (2014.01) |
| *H04N 19/174* | (2014.01) |
| *H04N 19/167* | (2014.01) |

(52) U.S. Cl.
CPC ............ *H04L 65/607* (2013.01); *G06T 9/001* (2013.01); *G06T 15/04* (2013.01); *H04N 19/154* (2014.11); *H04N 19/167* (2014.11); *H04N 19/174* (2014.11); *H04N 19/46* (2014.11); *H04N 19/597* (2014.11)

(58) Field of Classification Search
CPC .................................................. H04N 19/597
See application file for complete search history.

(56) References Cited

U.S. PATENT DOCUMENTS

| | | | |
|---|---|---|---|
| 6,356,297 B1 | 3/2002 | Cheng et al. | |
| 2001/0050955 A1 | 12/2001 | Zhang et al. | |
| 2006/0034374 A1 | 2/2006 | Park et al. | |

FOREIGN PATENT DOCUMENTS

| | | |
|---|---|---|
| EP | 1162830 A2 | 12/2001 |
| EP | 2645713 A1 | 10/2013 |
| WO | 2016/064862 A1 | 4/2016 |

OTHER PUBLICATIONS

International Search Report and Written Opinion received for PCT Patent Application No. PCT/US2015/056442, dated Feb. 18, 2016, 12 pages.

*Primary Examiner* — Young Lee
(74) *Attorney, Agent, or Firm* — Brake Hughes Bellermann LLP

(57) ABSTRACT

In a general aspect, a method includes determining a tile position in a frame of a spherical video based on a view perspective, selecting a portion of the frame of the spherical video as a two dimensional tile based on the tile position, encoding the two dimensional tile at a first quality, mapping the frame of the spherical video to a two dimensional representation of the spherical video based on a two dimensional projection algorithm, and encoding the two dimensional representation of the spherical video at a second quality.

8 Claims, 15 Drawing Sheets

STREAMING THE VISIBLE PARTS OF A SPHERICAL VIDEO

FIELD

Embodiments relate to streaming spherical video.

BACKGROUND

Streaming spherical video (or other three dimensional video) can consume a significant amount of system resources. For example, an encoded spherical video can include a large number of bits for transmission which can consume a significant amount of bandwidth as well as processing and memory associated with encoders and decoders.

SUMMARY

Example embodiments describe systems and methods to optimize streaming spherical video (and/or other three dimensional video) based on visible (by a viewer of a video) portions of the spherical video.

In a general aspect, a method includes determining a tile position in a frame of a spherical video based on a view perspective, selecting a portion of the frame of the spherical video as a two dimensional tile based on the tile position, encoding the two dimensional tile at a first quality, mapping the frame of the spherical video to a two dimensional representation of the spherical video based on a two dimensional projection algorithm, and encoding the two dimensional representation of the spherical video at a second quality.

Implementations can include one or more of the following features. For example, the method can further include transmitting the encoded two dimensional tile and the encoded two dimensional representation as a streaming spherical video. The first quality is a higher quality as compared to the second quality. The view perspective can be based on a viewable portion of the spherical video as seen by a viewer during a playback of the spherical video. For example, the method can further include receiving an indication of the view perspective from a device executing a playback of the spherical video. For example, the method can further include transmitting the encoded two dimensional tile over a first time period while streaming the spherical video, and transmitting the encoded two dimensional tile and the encoded two dimensional representation over a first time period while streaming the spherical video.

For example, the selecting of the portion of the frame of the spherical video as the two dimensional tile and the encoding of the two dimensional tile can include selecting the two dimensional tile from a datastore of previously encoded tiles and reading the from the two dimensional tile from the datastore. The selecting of the portion of the frame of the spherical video as the two dimensional tile can include selecting the two dimensional tile from the frame of the spherical video as a frame to be encoded based on a position on the spherical video, wherein the position on the spherical video is based on the view perspective. The encoding of the two dimensional tile can include generating at least one residual for the two dimensional tile by subtracting a template from un-encoded pixels of a block of the two dimensional tile to be encoded, encoding the at least one residual by applying a transform to a residual block including the at least one residual, quantizing transform coefficients associated with the encoded at least one residual and entropy encoding the quantized transform coefficients as at least one compressed video bit, wherein at least one of the generating of the at least one residual, the encoding of the at least one residual, the quantizing of the transform coefficients, and the quantizing of the transform coefficients includes setting of at least one parameter based on the first quality.

For example, the encoding of the two dimensional representation of the spherical video can include generating at least one residual for the two dimensional representation of the spherical video by subtracting a template from un-encoded pixels of a block of the two dimensional representation of the spherical video to be encoded, encoding the at least one residual by applying a transform to a residual block including the at least one residual, quantizing transform coefficients associated with the encoded at least one residual, and entropy encoding the quantized transform coefficients as at least one compressed video bit, wherein at least one of the generating of the at least one residual, the encoding of the at least one residual, the quantizing of the transform coefficients, and the quantizing of the transform coefficients includes setting of at least one parameter based on the second quality.

In a general aspect, a method includes receiving an encoded bit stream including an encoded two dimensional representation of a spherical video frame and an encoded two dimensional tile selected from the spherical video frame, decoding the two dimensional tile, decoding the two dimensional representation of the spherical video frame, converting the two dimensional representation to the spherical video frame, and replacing corresponding blocks of the spherical video frame with the decoded two dimensional tile.

Implementations can include one or more of the following features. For example, the receiving of the encoded bit stream includes receiving a header indicating a technique used during a conversion of a frame of the spherical video to the two dimensional representation of the spherical video frame. The replacing of the corresponding blocks of the spherical video frame with the decoded two dimensional tile includes one of pixel by pixel or block by block replacement of pixels or blocks in the decoded and converted spherical video frame with pixels or blocks of the decoded two dimensional tile.

For example, the converting of the two dimensional representation of the spherical video frame includes mapping the two dimensional representation of the spherical video frame to a spherical image using an inverse of a technique used to map the spherical video frame to the two dimensional representation of the spherical video frame. For example, the method can further include generating a spherical video stream based on at least one spherical video frame including the replaced two dimensional tile such that during a playback of the spherical video stream, wherein a visible portion of the spherical video stream is of a higher quality than a non-visible portion of the spherical video stream.

In a general aspect, a non-transitory computer-readable storage medium having stored thereon computer executable program code which, when executed on a computer system, causes the computer system to perform steps including determining a tile position in a frame of a spherical video based on a view perspective, selecting a portion of the frame of the spherical video as a two dimensional tile based on the tile position, encoding the two dimensional tile at a first quality, mapping the frame of the spherical video to a two dimensional representation of the spherical video based on a two dimensional projection algorithm, and encoding the two dimensional representation of the spherical video at a second quality.

Implementations can include one or more of the following features. For example, the steps can further include receiving an indication of the view perspective from a device executing a playback of the spherical video, wherein the view perspective is based on a viewable portion of the spherical video as seen by a viewer during the playback of the spherical video. The first quality is a higher quality as compared to the second quality. The selecting of the portion of the frame of the spherical video as the two dimensional tile and the encoding of the two dimensional tile can include selecting the two dimensional tile from a datastore of previously encoded tiles, and reading the two dimensional tile from the two dimensional tile from the datastore. The selecting of the portion of the frame of the spherical video as the two dimensional tile can include selecting the two dimensional tile from the frame of the spherical video as a frame to be encoded based on a position on the spherical video, wherein the position on the spherical video is based on the view perspective.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1A:
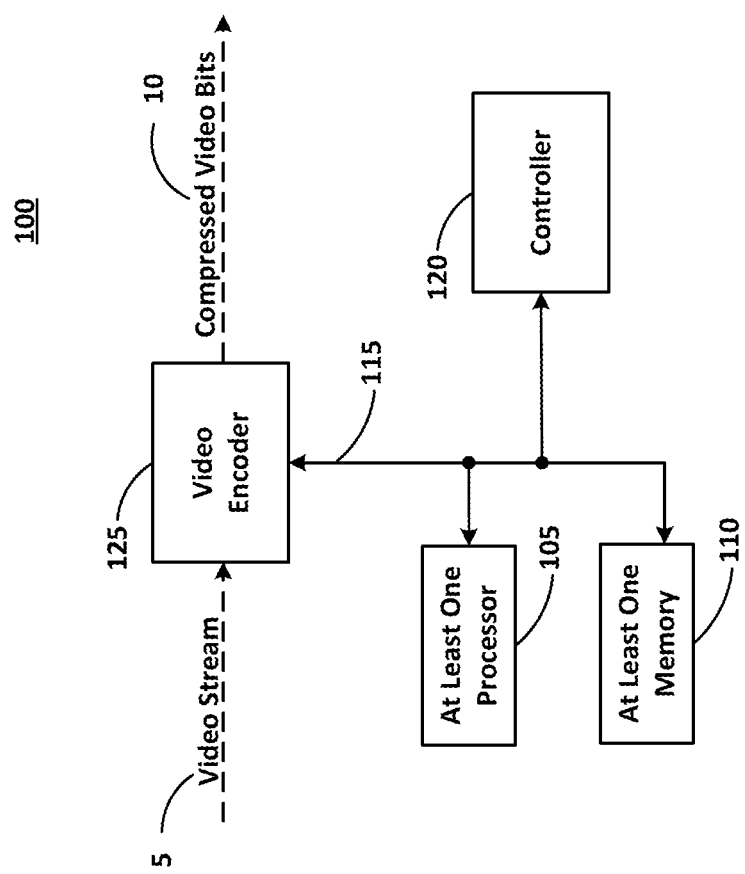
FIG. 1A illustrates a video encoder system according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

In the example embodiments, in addition to streaming a frame of encoded spherical video, a tile (e.g., a portion of the frame), selected based on a point of reference of a viewer, is encoded at, for example, a higher quality (e.g., higher resolution and/or less distortion) and streamed together with the encoded frame of spherical video. During decoding of the frame of encoded spherical video, the decoded tile replaces a corresponding portion of the decoded frame of spherical video. Accordingly, during play back, the viewer can view the decoded tile (at the higher quality) while the entire spherical video is being played back and available should the point of reference of a viewer change.

In the example of FIG. 1A, a video encoder system 100 may be, or include, at least one computing device and can represent virtually any computing device configured to perform the methods described herein. As such, the video encoder system 100 can include various components which may be utilized to implement the techniques described herein, or different or future versions thereof. By way of example, the video encoder system 100 is illustrated as including at least one processor 105, as well as at least one memory 110 (e.g., a non-transitory computer readable storage medium).

FIG. 1A illustrates the video encoder system according to at least one example embodiment. As shown in FIG. 1A, the video encoder system 100 includes the at least one processor 105, the at least one memory 110, a controller 120, and a video encoder 125. The at least one processor 105, the at least one memory 110, the controller 120, and the video encoder 125 are communicatively coupled via bus 115.

The at least one processor 105 may be utilized to execute instructions stored on the at least one memory 110, so as to thereby implement the various features and functions described herein, or additional or alternative features and functions. The at least one processor 105 and the at least one memory 110 may be utilized for various other purposes. In particular, the at least one memory 110 can represent an example of various types of memory and related hardware and software which might be used to implement any one of the modules described herein.

The at least one memory 110 may be configured to store data and/or information associated with the video encoder system 100. For example, the at least one memory 110 may be configured to store codecs associated with encoding spherical video. For example, the at least one memory may be configured to store code associated with selecting a portion of a frame of the spherical video as a tile to be encoded separately from the encoding of the spherical video. The at least one memory 110 may be a shared resource. As discussed in more detail below, the tile may be a plurality of pixels selected based on a view perspective of a viewer during playback of the spherical viewer. The plurality of pixels may be a block, plurality of blocks or macro-block that can include a portion of the spherical image that can be seen by the user. For example, the video encoder system 100 may be an element of a larger system (e.g., a server, a personal computer, a mobile device, and the like). Therefore, the at least one memory 110 may be configured to store data and/or information associated with other elements (e.g., image/video serving, web browsing or wired/wireless communication) within the larger system.

The controller 120 may be configured to generate various control signals and communicate the control signals to various blocks in video encoder system 100. The controller 120 may be configured to generate the control signals to implement the techniques described below. The controller 120 may be configured to control the video encoder 125 to encode an image, a sequence of images, a video frame, a video sequence, and the like according to example embodiments. For example, the controller 120 may generate control signals corresponding to parameters for encoding spherical video. More details related to the functions and operation of the video encoder 125 and controller 120 will be described below in connection with at least FIGS. 2A, 4A, 5A, 5B and 6-9.

The video encoder 125 may be configured to receive a video stream input 5 and output compressed (e.g., encoded) video bits 10. The video encoder 125 may convert the video stream input 5 into discrete video frames. The video stream input 5 may also be an image, accordingly, the compressed (e.g., encoded) video bits 10 may also be compressed image bits. The video encoder 125 may further convert each discrete video frame (or image) into a matrix of blocks (hereinafter referred to as blocks). For example, a video frame (or image) may be converted to a 16×16, a 16×8, an 8×8, a 4×4 or a 2×2 matrix of blocks each having a number of pixels. Although five example matrices are listed, example embodiments are not limited thereto.

The compressed video bits 10 may represent the output of the video encoder system 100. For example, the compressed video bits 10 may represent an encoded video frame (or an encoded image). For example, the compressed video bits 10 may be ready for transmission to a receiving device (not shown). For example, the video bits may be transmitted to a system transceiver (not shown) for transmission to the receiving device.

The at least one processor 105 may be configured to execute computer instructions associated with the controller 120 and/or the video encoder 125. The at least one processor 105 may be a shared resource. For example, the video encoder system 100 may be an element of a larger system (e.g., a mobile device). Therefore, the at least one processor 105 may be configured to execute computer instructions associated with other elements (e.g., image/video serving, web browsing or wired/wireless communication) within the larger system.

Figure 1B:
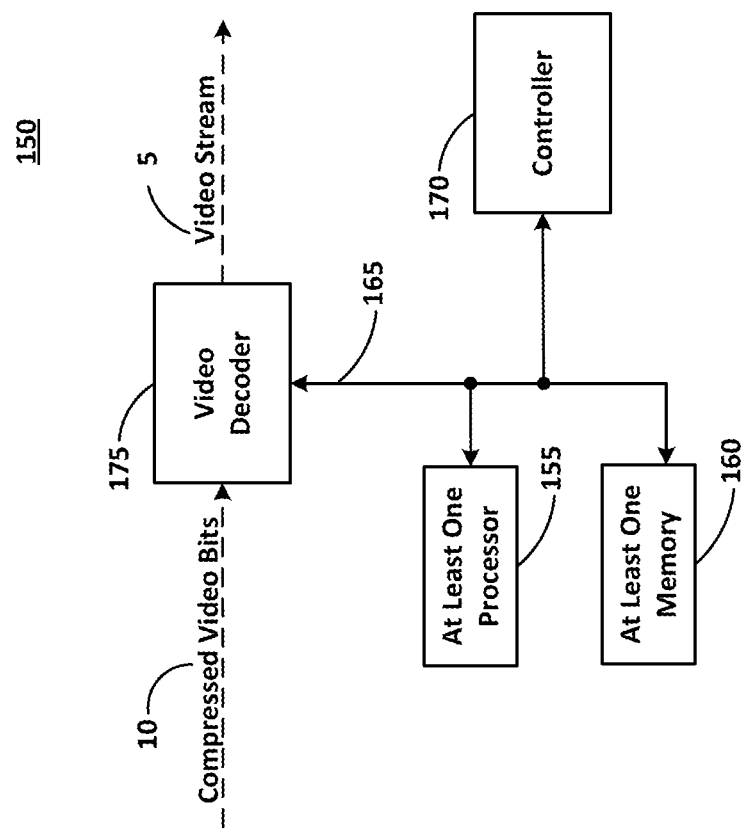
FIG. 1B illustrates a video decoder system according to at least one example embodiment.

In the example of FIG. 1B, a video decoder system 150 may be at least one computing device and can represent virtually any computing device configured to perform the methods described herein. As such, the video decoder system 150 can include various components which may be utilized to implement the techniques described herein, or different or future versions thereof. By way of example, the video decoder system 150 is illustrated as including at least one processor 155, as well as at least one memory 160 (e.g., a computer readable storage medium).

Thus, the at least one processor 155 may be utilized to execute instructions stored on the at least one memory 160, so as to thereby implement the various features and functions described herein, or additional or alternative features and functions. The at least one processor 155 and the at least one memory 160 may be utilized for various other purposes. In particular, the at least one memory 160 can represent an example of various types of memory and related hardware and software which might be used to implement any one of the modules described herein. According to example embodiments, the video encoder system 100 and the video decoder system 150 may be included in a same larger system (e.g., a personal computer, a mobile device and the like). According to example embodiments, video decoder system 150 may be configured to implement the reverse or opposite techniques described with regard to the video encoder system 100.

The at least one memory 160 may be configured to store data and/or information associated with the video decoder system 150. For example, the at least one memory 110 may be configured to store codecs associated with decoding encoded spherical video data. For example, the at least one memory may be configured to store code associated with decoding an encoded tile and a separately encoded spherical video frame as well as code for replacing pixels in the decoded spherical video frame with the decoded tile. The at least one memory 160 may be a shared resource. For example, the video decoder system 150 may be an element of a larger system (e.g., a personal computer, a mobile device, and the like). Therefore, the at least one memory 160 may be configured to store data and/or information associated with other elements (e.g., web browsing or wireless communication) within the larger system.

The controller 170 may be configured to generate various control signals and communicate the control signals to various blocks in video decoder system 150. The controller 170 may be configured to generate the control signals in order to implement the video decoding techniques described below. The controller 170 may be configured to control the video decoder 175 to decode a video frame according to example embodiments. The controller 170 may be configured to generate control signals corresponding to decoding video. More details related to the functions and operation of the video decoder 175 and controller 170 will be described below in connection with at least FIGS. 2B, 4B, 6 and 10.

The video decoder 175 may be configured to receive a compressed (e.g., encoded) video bits 10 input and output a video stream 5. The video decoder 175 may convert discrete video frames of the compressed video bits 10 into the video stream 5. The compressed (e.g., encoded) video bits 10 may also be compressed image bits, accordingly, the video stream 5 may also be an image.

The at least one processor 155 may be configured to execute computer instructions associated with the controller 170 and/or the video decoder 175. The at least one processor 155 may be a shared resource. For example, the video decoder system 150 may be an element of a larger system (e.g., a personal computer, a mobile device, and the like). Therefore, the at least one processor 155 may be configured to execute computer instructions associated with other elements (e.g., web browsing or wireless communication) within the larger system.

Figure 2A:
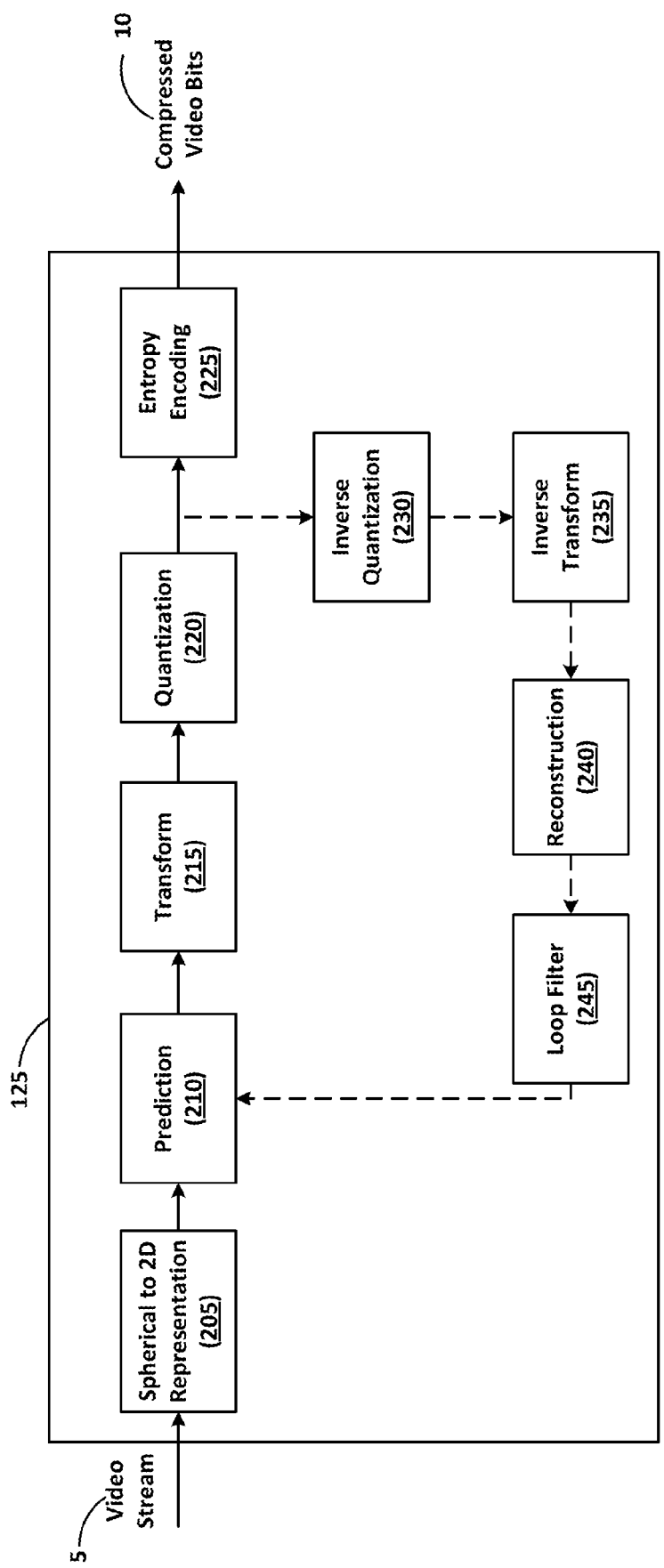
FIG. 2A illustrates a flow diagram for a video encoder system according to at least one example embodiment.
Figure 2B:
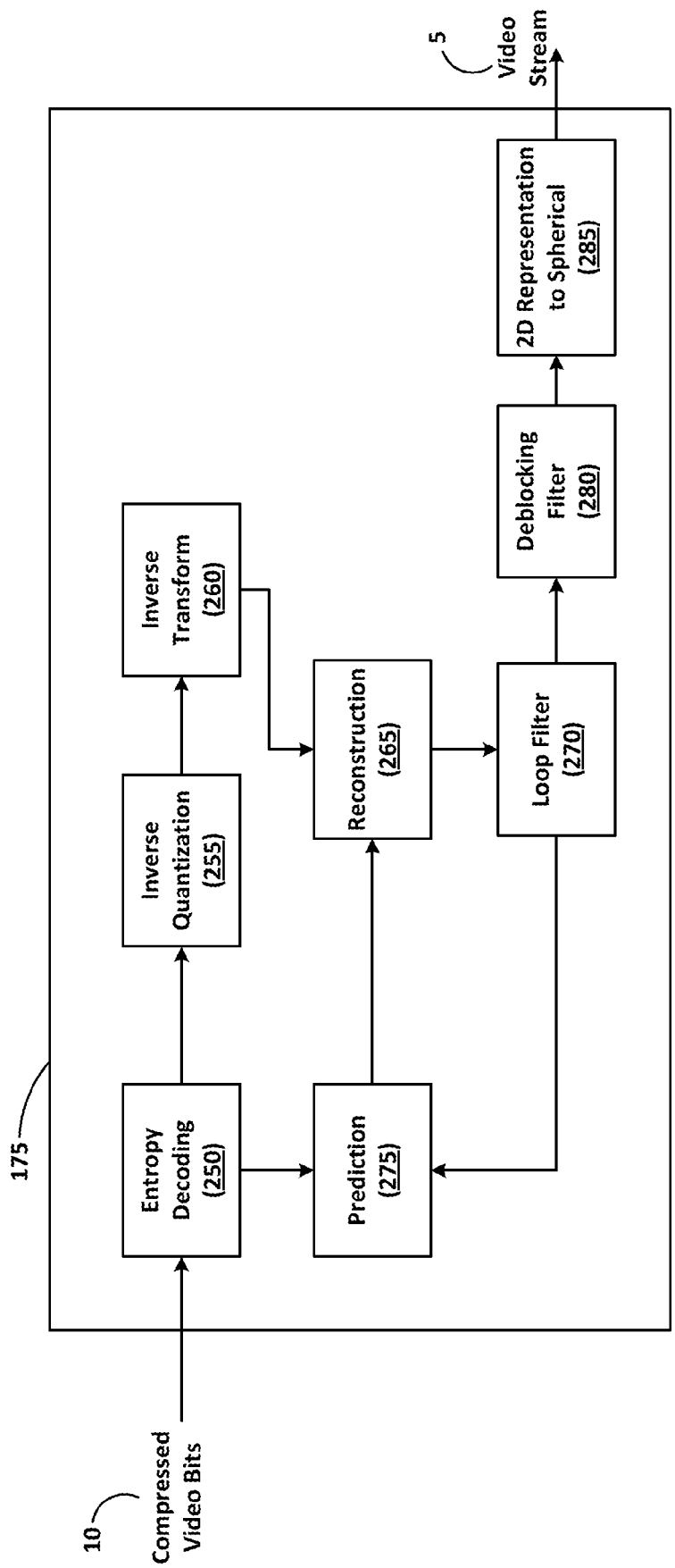
FIG. 2B illustrates a flow diagram for a video decoder system according to at least one example embodiment.

FIGS. 2A and 2B illustrate a flow diagram for the video encoder 125 shown in FIG. 1A and the video decoder 175 shown in FIG. 1B, respectively, according to at least one example embodiment. The video encoder 125 (described above) includes a spherical to 2D representation block 205, a prediction block 210, a transform block 215, a quantization block 220, an entropy encoding block 225, an inverse quantization block 230, an inverse transform block 235, a reconstruction block 240, and a loop filter block 245. Other structural variations of video encoder 125 can be used to encode input video stream 5. As shown in FIG. 2A, dashed lines represent a reconstruction path amongst the several blocks and solid lines represent a forward path amongst the several blocks.

Each of the aforementioned blocks may be executed as software code stored in a memory (e.g., at least one memory 110) associated with a video encoder system (e.g., as shown in FIG. 1A) and executed by at least one processor (e.g., at least one processor 105) associated with the video encoder system. However, alternative embodiments are contemplated such as a video encoder embodied as a special purpose processor. For example, each of the aforementioned blocks (alone and/or in combination) may be an application-specific integrated circuit, or ASIC. For example, the ASIC may be configured as the transform block 215 and/or the quantization block 220.

Figure 3:
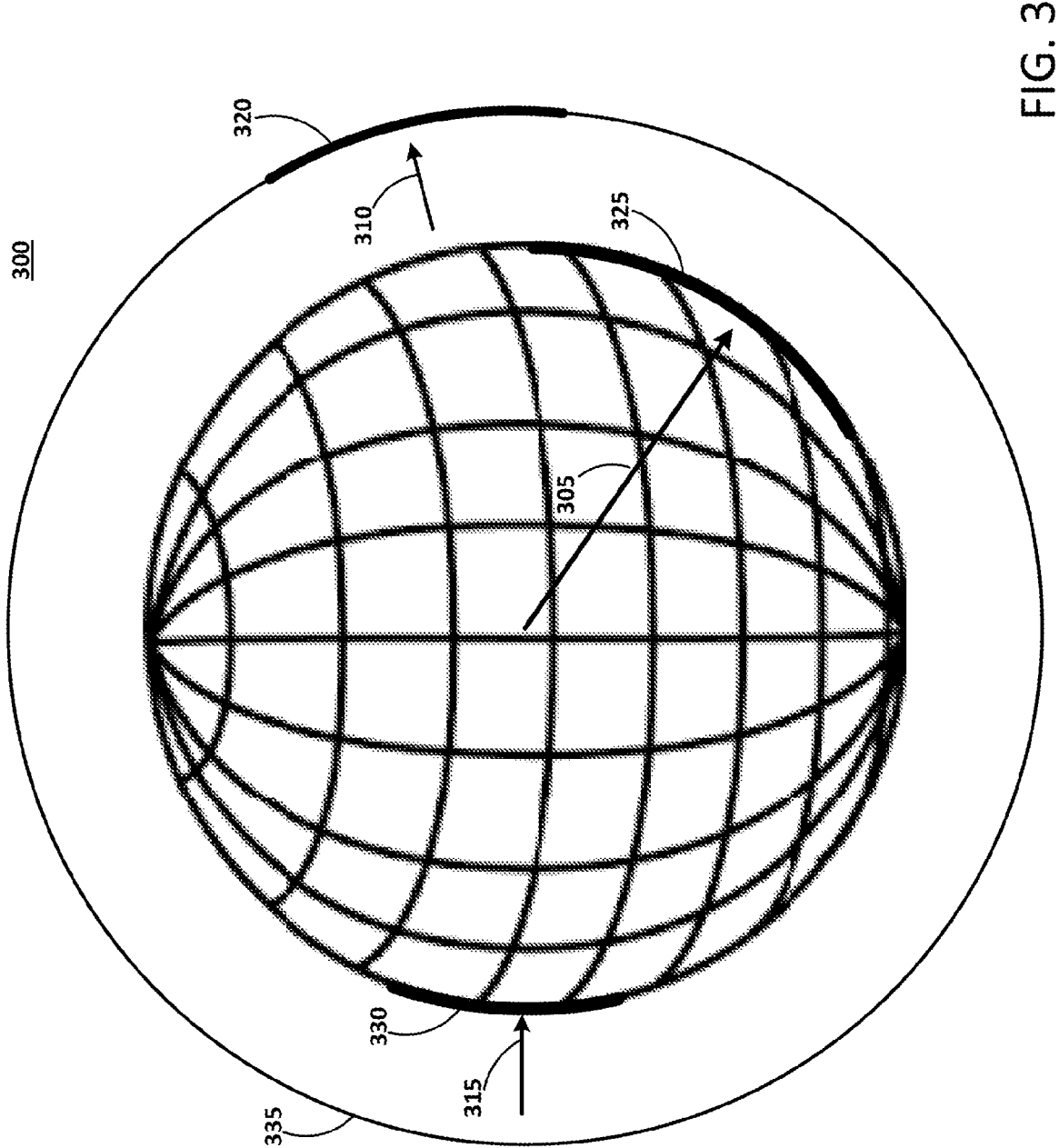
FIG. 3 illustrates a two dimensional (2D) representation of a sphere according to at least one example embodiment.

The spherical to 2D representation block 205 may be configured to map a spherical frame or image to a 2D representation of the spherical frame or image. For example, FIG. 3 illustrates the sphere 300 (e.g., as a frame or an image). The sphere 300 can be projected onto the surface of another shape (e.g., square, rectangle, cylinder and/or cube). The projection can be, for example, equirectangular or semi-equirectangular. Mapping a spherical frame or image to a 2D representation of the spherical frame or image is described in more detail below with regard to FIG. 5.

The prediction block 210 may be configured to utilize video frame coherence (e.g., pixels that have not changed as compared to previously encoded pixels). Prediction may include two types. For example, prediction may include intra-frame prediction and inter-frame prediction. Intra-frame prediction relates to predicting the pixel values in a block of a picture relative to reference samples in neighboring, previously coded blocks of the same picture. In intra-frame prediction, a sample is predicted from reconstructed pixels within the same frame for the purpose of reducing the residual error that is coded by the transform (e.g., entropy encoding block 225) and entropy coding (e.g., entropy encoding block 225) part of a predictive transform codec. Inter-frame prediction relates to predicting the pixel values in a block of a picture relative to data of a previously coded picture.

The transform block 215 may be configured to convert the values of the pixels from the spatial domain to transform coefficients in a transform domain. The transform coefficients may correspond to a two-dimensional matrix of coefficients that is ordinarily the same size as the original block. In other words, there may be as many transform coefficients as pixels in the original block. However, due to the transform, a portion of the transform coefficients may have values equal to zero.

The transform block 215 may be configured to transform the residual (from the prediction block 210) into transform coefficients in, for example, the frequency domain. Typically, transforms include the Karhunen-Loève Transform (KLT), the Discrete Cosine Transform ("DCT"), the Singular Value Decomposition Transform ("SVD") and the asymmetric discrete sine transform (ADST).

The quantization block 220 may be configured to reduce the data in each transformation coefficient. Quantization may involve mapping values within a relatively large range to values in a relatively small range, thus reducing the amount of data needed to represent the quantized transform coefficients. The quantization block 220 may convert the transform coefficients into discrete quantum values, which are referred to as quantized transform coefficients or quantization levels. For example, the quantization block 220 may be configured to add zeros to the data associated with a transformation coefficient. For example, an encoding standard may define 128 quantization levels in a scalar quantization process.

The quantized transform coefficients are then entropy encoded by entropy encoding block 225. The entropy-encoded coefficients, together with the information required to decode the block, such as the type of prediction used, motion vectors and quantizer value, are then output as the compressed video bits 10. The compressed video bits 10 can be formatted using various techniques, such as run-length encoding (RLE) and zero-run coding.

The reconstruction path in FIG. 2A is present to ensure that both the video encoder 125 and the video decoder 175 (described below with regard to FIG. 2B) use the same reference frames to decode compressed video bits 10 (or compressed image bits). The reconstruction path performs functions that are similar to functions that take place during the decoding process that are discussed in more detail below, including inverse quantizing the quantized transform coefficients at the inverse quantization block 230 and inverse transforming the inverse quantized transform coefficients at the inverse transform block 235 in order to produce a derivative residual block (derivative residual). At the reconstruction block 240, the prediction block that was predicted at the prediction block 210 can be added to the derivative residual to create a reconstructed block. A loop filter 245 can then be applied to the reconstructed block to reduce distortion such as blocking artifacts.

The video encoder 125 described above with regard to FIG. 2A includes the blocks shown. However, example embodiments are not limited thereto. Additional blocks may be added based on the different video encoding configurations and/or techniques used. Further, each of the blocks shown in the video encoder 125 described above with regard to FIG. 2A may be optional blocks based on the different video encoding configurations and/or techniques used.

FIG. 2B is a schematic block diagram of a decoder 175 configured to decode compressed video bits 10 (or compressed image bits). Decoder 175, similar to the reconstruction path of the encoder 125 discussed previously, includes an entropy decoding block 250, an inverse quantization block 255, an inverse transform block 260, a reconstruction block 265, a loop filter block 270, a prediction block 275, a deblocking filter block 280 and a 2D representation to spherical block 285.

The data elements within the compressed video bits 10 can be decoded by entropy decoding block 250 (using, for example, Context Adaptive Binary Arithmetic Decoding) to produce a set of quantized transform coefficients. Inverse quantization block 255 dequantizes the quantized transform coefficients, and inverse transform block 260 inverse transforms (using ADST) the dequantized transform coefficients to produce a derivative residual that can be identical to that created by the reconstruction stage in the encoder 125.

Using header information decoded from the compressed video bits 10, decoder 175 can use prediction block 275 to create the same prediction block as was created in encoder 175. The prediction block can be added to the derivative residual to create a reconstructed block by the reconstruction block 265. The loop filter block 270 can be applied to the reconstructed block to reduce blocking artifacts. Deblocking filter block 280 can be applied to the reconstructed block to reduce blocking distortion, and the result is output as video stream 5.

The 2D representation to spherical block 285 may be configured to map a 2D representation of a spherical frame or image to a spherical frame or image. For example, FIG. 3 illustrates a sphere 300 (e.g., as a frame or an image). The sphere 300 can be projected onto a 2D surface (e.g., a square or a rectangle). The projection can be, for example, equirectangular or semi-equirectangular. The mapping of the 2D representation of a spherical frame or image to the spherical frame or image can be the inverse of the previous mapping.

The video decoder 175 described above with regard to FIG. 2B includes the blocks shown. However, example embodiments are not limited thereto. Additional blocks may be added based on the different video encoding configurations and/or techniques used. Further, each of the blocks shown in the video decoder 175 described above with regard to FIG. 2B may be optional blocks based on the different video encoding configurations and/or techniques used.

The encoder 125 and the decoder may be configured to encode spherical video and/or images and to decode spherical video and/or images, respectively. A spherical image is an image that includes a plurality of pixels spherically organized. In other words, a spherical image is an image that is continuous in all directions. Accordingly, a viewer of a spherical image can reposition or reorient (e.g., move her head or eyes) in any direction (e.g., up, down, left, right, or any combination thereof) and continuously see a portion of the image.

A spherical image can have perspective. For example, a spherical image could be an image of a globe. An inside perspective could be a view from a center of the globe looking outward. Or the inside perspective could be on the globe looking out to space. An outside perspective could be a view from space looking down toward the globe. As another example, perspective can be based on that which is viewable. In other words, a viewable perspective can be that which can be seen by a viewer during a playback of the spherical video. The viewable perspective can be a portion of the spherical image that is in front of the viewer during playback of the spherical video. For example, when viewing from an inside perspective, a viewer could be lying on the ground (e.g., earth) and looking out to space. The viewer may see, in the image, the moon, the sun or specific stars. However, although the ground the viewer is lying on is included in the spherical image, the ground is outside the current viewable perspective. In this example, the viewer could turn her head and the ground would be included in a peripheral viewable perspective. The viewer could flip over and the ground would be in the viewable perspective whereas the moon, the sun or stars would not.

A viewable perspective from an outside perspective may be a portion of the spherical image that is not blocked (e.g., by another portion of the image) and/or a portion of the spherical image that has not curved out of view. Another portion of the spherical image may be brought into a viewable perspective from an outside perspective by moving (e.g., rotating) the spherical image and/or by movement of the spherical image. Therefore, the viewable perspective is a portion of the spherical image that is within a viewable range of a viewer of the spherical image.

A spherical image is an image that does not change with respect to time. For example, a spherical image from an inside perspective as relates to the earth may show the moon and the stars in one position. Whereas a spherical video (or sequence of images) may change with respect to time. For example, a spherical video from an inside perspective as relates to the earth may show the moon and the stars moving (e.g., because of the earths rotation) and/or an airplane streak across the image (e.g., the sky).

FIG. 3 is a two dimensional (2D) representation of a sphere. As shown in FIG. 3, the sphere 300 (e.g., as a spherical image) illustrates a direction of inside perspective 305, 310, outside perspective 315 and viewable perspective 320, 325, 330. The viewable perspective 320 may be a portion of a spherical image 335 as viewed from inside perspective 310. The viewable perspective 325 may be a portion of the sphere 300 as viewed from inside perspective 305. The viewable perspective 330 may be a portion of the sphere 300 as viewed from outside perspective 315.

Figure 4A:
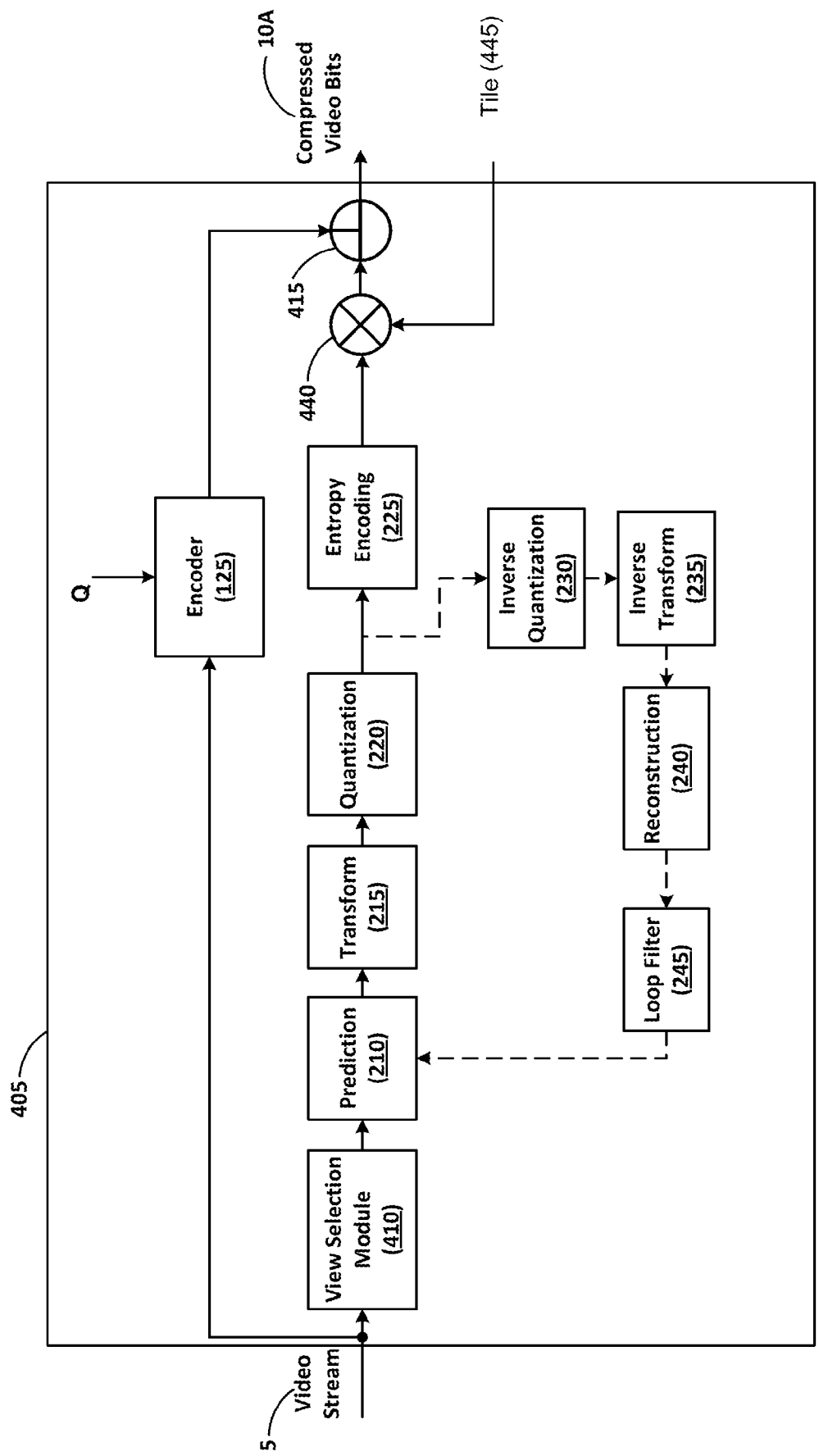
FIG. 4A illustrates another flow diagram for a video encoder system according to at least one example embodiment.

FIG. 4A illustrates another flow diagram for a video encoder system 405 according to at least one example embodiment. The video encoder 405 can replace video encoder 125 in system 100 shown in FIG. 1A and described above. Accordingly, the video encoder 405 includes a spherical to 2D representation block 205, a prediction block 210, a transform block 215, a quantization block 220, an entropy encoding block 225, an inverse quantization block 230, an inverse transform block 235, a reconstruction block 240, and a loop filter block 245. In addition, the video encoder 405 includes a view selection module 410, encoder 125, and packet builder (or combiner) 415. In an alternative implementation (and/or an additional implementation), the encoder 405 includes a switch 440. Other structural variations of video encoder 405 can be used to encode input video stream 5. As shown in FIG. 4A, dashed lines represent a reconstruction path amongst the several blocks and solid lines represent a forward path amongst the several blocks.

The view selection module 410 may be configured to select a tile (or plurality of tiles) based a view or perspective or view perspective of a user watching the spherical video. For example, as discussed above, the view, perspective or view perspective may be a viewable perspective 320 which in turn may be a portion of the sphere 300 as viewed from inside perspective 305. The tile may be a plurality of pixels selected based on the view. The plurality of pixels may be a block, plurality of blocks or macro-block that can include a portion of the spherical image that can be seen by the user. The portion of the spherical image may have a length and width. The portion of the spherical image may be two dimensional or substantially two dimensional. The tile can have a variable size (e.g., how much of the sphere the tile covers). For example, the size of the tile can be encoded and streamed based on, for example, how wide the viewer's field of view is and/or how quickly the user is rotating their head. For example, if the viewer is continually looking around, then larger, lower quality tiles may be selected. However, if the viewer is focusing on one perspective, smaller more detailed tiles may be selected.

In an example implementation, parameters used in and/or determined by encoder 125 can be used by other elements of the encoder 405. For example, motion vectors (e.g., as used in prediction) used to encode the 2D representation could be used to encode the tile. Further, parameters used in and/or determined by the prediction block 210, the transform block 215, the quantization block 220, the entropy encoding block 225, the inverse quantization block 230, the inverse transform block 235, the reconstruction block 240, and the loop filter block 245 could be shared between encoder 125 and the encoder 405.

The portion of the spherical video frame or image may be processed as an image. Therefore, the portion of the spherical video frame may be converted (or decomposed) to a C×R matrix of blocks (hereinafter referred to as blocks). For example, the portion of the spherical video frame may be converted to a C×R matrix of 16×16, 16×8, 8×16, 8×8, 8×4, 4×8, 4×4 or 2×2 blocks each having a number of pixels.

According to an example implementation, the encoder 125 may encode a frame at a different quality (or quality of service (QoS)), as indicated by Q, than the encoder 405 encodes the tile. The QoS can be based on compression algorithm, a transmission rate, and/or an encoding scheme. Therefore, the encoder 125 may use a different compression algorithm and/or encoding scheme than encoder 405. For example, the encoded tile may be at a higher QoS than the frame encoded by the encoder 125. As discussed above, encoder 125 may be configured to encode a 2D representation of the spherical video frame. Accordingly, the tile (as a viewable perspective including a portion of the spherical video frame) can be encoded with a higher QoS than the 2D representation of the spherical video frame. The QoS may affect the resolution of the frame when decoded. Accordingly, the tile (as a viewable perspective including a portion of the spherical video frame) can be encoded such that the tile has a higher resolution of the frame when decoded as compared to a decoded 2D representation of the spherical video frame.

The packet builder 415 may be configured to build a packet for transmission. The packet may include compressed video bits 10A. The packet may include the encoded 2D representation of the spherical video frame and the encoded tile (or plurality of tiles). The packet may include may include a header for transmission. The header may include, amongst other things, the information indicating the mode or scheme use in intra-frame coding by the encoder. The header may include information indicating parameters used to convert a frame of the spherical video frame to a 2D rectangular representation. The header may include information indicating parameters used to achieve the QoS of the encoded 2D rectangular representation and of the encoded tile.

In an alternative implementation (and/or an additional implementation), the encoder 405 can project the tile using a different projection technique or algorithm than that used to generate the 2D representation of the spherical video frame. Some projections can have distortions in certain areas of the frame. Accordingly, projecting the tile differently than the spherical frame can improve the quality of the final image, and/or use pixels more efficiently. In one example implementation, the spherical image can be rotated before projecting the tile in order to orient the tile in a position that is minimally distorted based on the projection algorithm. In another example implementation, the tile can use (and/or modify) a projection algorithm that is based on the position of the tile. For example, projecting the spherical video frame to the 2D representation of can use an equirectangular projection, whereas projecting the spherical video frame to a representation including a portion to be selected as the tile can use a cubic projection.

In an alternative implementation (and/or an additional implementation), the encoder 405 includes the switch 440. In this example implementation, instead of encoding a tile based on the selected view, the tile is chosen from a previously encoded (and stored) tile as read from a datastore (e.g., view frame storage 515). The previously encoded tile can be time and view dependent. In other words, the tile can be selected based on the frame that is currently being encoded (e.g., by encoder 125 as shown in FIG. 4A). Accordingly, the frame that is currently being encoded and the selected tile are from the same source file (e.g., the same (or equivalent) spherical video file) and in the same time slice. The tile can be view, perspective or view perspective dependent because the previously encoded tile can be selected based on the same view as the view that would have been selected from the spherical video frame. In other words, the selected previously encoded tile is selected based on the same criteria as used by the view selection module 410 to select a tile from the spherical video frame to be encoded.

Figure 4B:
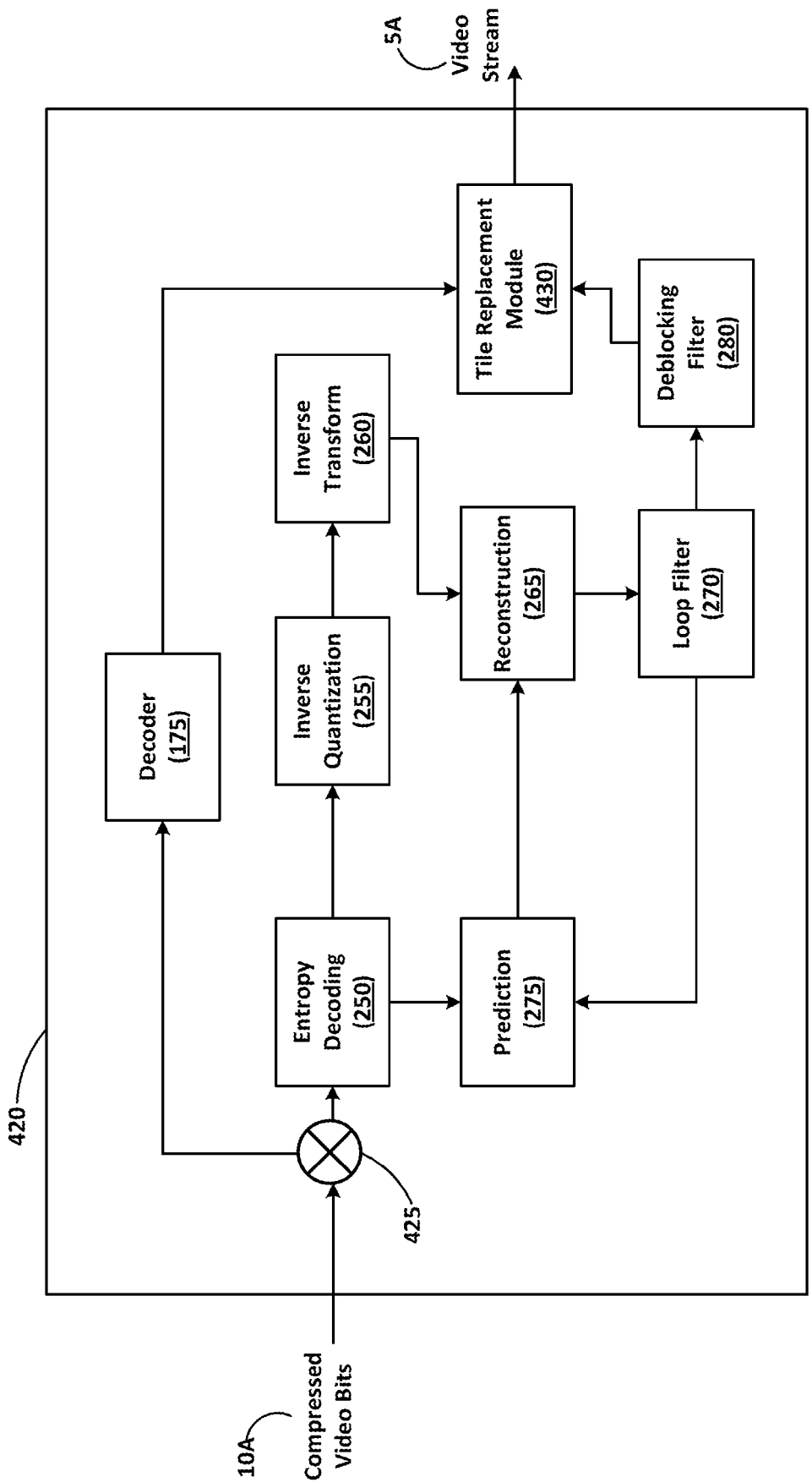
FIG. 4B illustrates another flow diagram for a video decoder system according to at least one example embodiment.

FIG. 4B illustrates another flow diagram for a video decoder system according to at least one example embodiment. The video decoder 420 can replace video decoder 175 in system 150 shown in FIG. 1B and described above. Accordingly, the video decoder 420 includes an entropy decoding block 250, an inverse quantization block 255, an inverse transform block 260, a reconstruction block 265, a loop filter block 270, a prediction block 275, a deblocking filter block 280 and a 2D representation to spherical block 285. In addition, the video decoder 420 includes decoder 175, a packet de-constructor 425, and a tile replacement module 430.

The packet de-constructor 425 may be configured to separate the encoded 2D rectangular representation of the spherical video frame from the encoded tile. The encoded 2D rectangular representation of the spherical video frame is then decoded by the decoder 175. The tile is also decoded and then the tile replacement module 430 may be configured to replace the corresponding pixels (or blocks or macroblock) in the spherical video frame with the pixels of the decoded tile. As discussed above, the tile was encoded with a higher QoS than the 2D rectangular representation of the spherical video frame. Accordingly, the resultant spherical video has a higher quality image (or portion of the spherical video) in the view, perspective or view perspective of the watcher of the spherical video as compared to the image(s) (or portion of the spherical video) that is not in (or outside) the view, perspective or view perspective of the watcher.

In an example implementation, parameters used in and/or determined by decoder 175 can be used by other elements of the encoder decoder 420. For example, motion vectors (e.g., as used in prediction) used to decode the 2D representation could be used to decode the tile. Further, parameters used in and/or determined by the entropy decoding block 250, the inverse quantization block 255, the inverse transform block 260, the reconstruction block 265, the loop filter block 270, a prediction block 275, the deblocking filter block 280 could be shared between decoder 175 and the decoder 420.

Figure 5A:
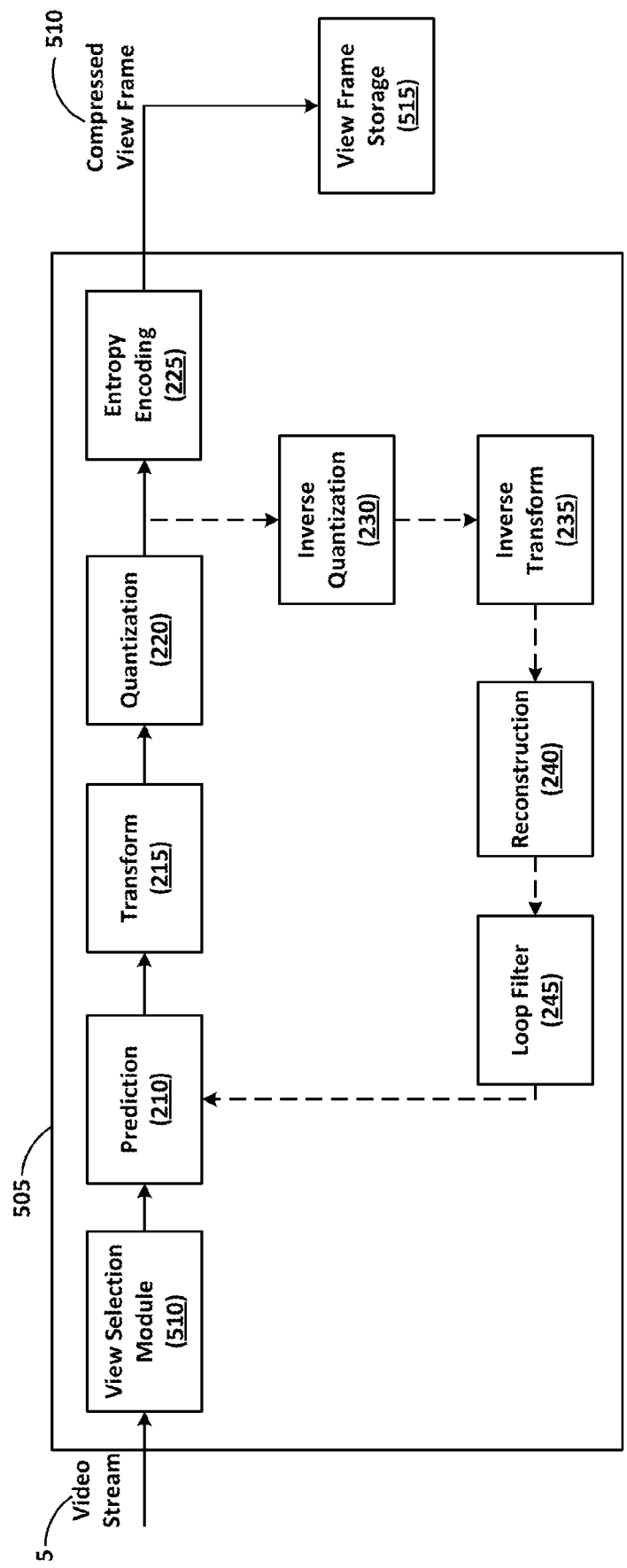
FIGS. 5A and 5B illustrate a flow diagram for a video encoder system according to at least one example embodiment.
Figure 5B:
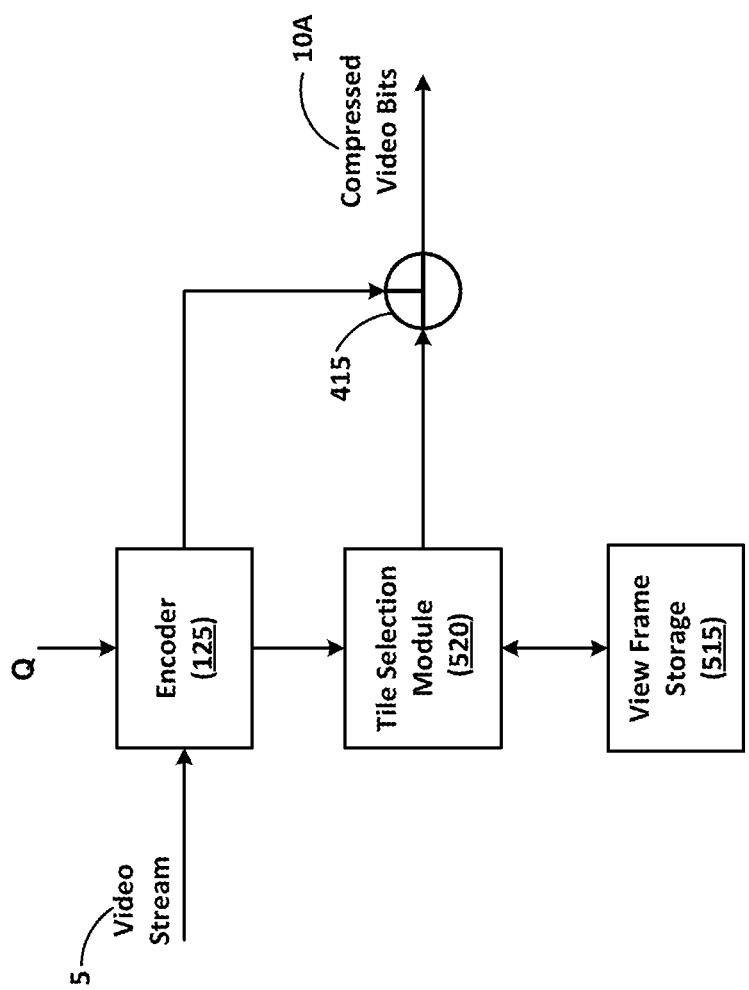

FIGS. 5A and 5B illustrate a flow diagram for a video encoder system according to at least one example embodiment. As shown in FIG. 5A, the encoder 505 adds features to encoder 125. Accordingly, the video encoder 505 includes a spherical to 2D representation block 205, a prediction block 210, a transform block 215, a quantization block 220, an entropy encoding block 225, an inverse quantization block 230, an inverse transform block 235, a reconstruction block 240, and a loop filter block 245. In addition, the video encoder 505 includes a view selection module 510. Other structural variations of video encoder 505 can be used to encode input video stream 5. As shown in FIG. 5A, dashed lines represent a reconstruction path amongst the several blocks and solid lines represent a forward path amongst the several blocks.

The view selection module 510 may be configured to select a tile (or plurality of tiles) based a view or perspective of a user watching the spherical video. For example, as discussed above, the view, perspective or view perspective may be a viewable perspective 320 which in turn may be a portion of the sphere 300 as viewed from inside perspective 305. The tile may be a plurality of pixels selected based on the view. The plurality of pixels may be a block, plurality of blocks or macro-block that can include a portion of the spherical image that can be seen by the user. The portion of the spherical image may have a length and width. The portion of the spherical image may be two dimensional or substantially two dimensional.

In an alternative implementation (and/or an additional implementation), the encoder 505 can project the tile (or plurality of tiles) using a different projection technique or algorithm than that used to generate the 2D representation of the spherical video frame. For example, some projections can have distortions in certain areas of the frame, so projecting the tile differently than the spherical frame can improve the quality of the final image, and/or use pixels more efficiently. In one example implementation, the spherical image can be rotated before projecting the tile in order to orient the tile in a position that is minimally distorted based on the projection algorithm. In another example implementation, the tile can use (and/or modify) a projection algorithm that is based on the position of the tile. For example, projecting the spherical video frame to the 2D representation of can use an equirectangular projection, whereas projecting the spherical video frame to a representation including a portion to be selected as the tile can use a cubic projection.

The portion of the spherical video frame or image may be processed as an image. Therefore, the portion of the spherical video frame may be converted (or decomposed) to a C×R matrix of blocks (hereinafter referred to as blocks). For example, the portion of the spherical video frame may be converted to a C×R matrix of 16×16, 16×8, 8×8, 4×4 or 2×2 blocks each having a number of pixels.

Encoder 505 may operate off-line as part of a set-up procedure for making a spherical video available for streaming. The view selection module 510 may be configured to select a plurality of views so that the encoder 505 can encode a plurality of tiles. Each of the plurality of tiles may be stored in view frame storage 515. Each of the plurality of tiles may be indexed such that each of the plurality of tiles that are stored with a reference to the frame (e.g., a time dependence) and a view (e.g., a view dependence). Accordingly, each of the plurality of tiles so that they are time and view, perspective or view perspective dependent and can be recalled based on the time and view dependence.

As such, in an example implementation, the encoder 505 may be configured to execute a loop where a frame is selected and a portion of the frame is selected as a tile based on a view. The tile is then encoded and stored. The loop continues to cycle through a plurality of views. When a desired number of views, for example, every 5 degrees around the vertical and every 5 degrees around the horizontal of the spherical image, are saved as tiles, a new frame is selected and the process repeats until all frames of the spherical video have a desired number of tiles saved for them. This is but one example implementation for encoding and saving tiles. Other implementations are contemplated and within the scope of this disclosure.

As shown in FIG. 5B, encoder 125 can be encoding a spherical video stream 5. The encoder 125 can communicate information to a tile selection module 520. For example, the encoder 125 can communicate an indication of a frame number, an indication of a view, perspective or view perspective and an indication of a QoS used for encoding the spherical video stream 5. The tile selection module 520 can use this information to select a tile (or plurality of tiles from the view frame storage 515. The packet builder 415 may be configured to build a packet for transmission. The packet may include compressed video bits 10A. Amongst other data or information, the packet may include the encoded 2D representation of the spherical video frame as encoded by encoder 125 and the encoded tile (or plurality of tiles as read from the view frame storage 515.

Figure 6:
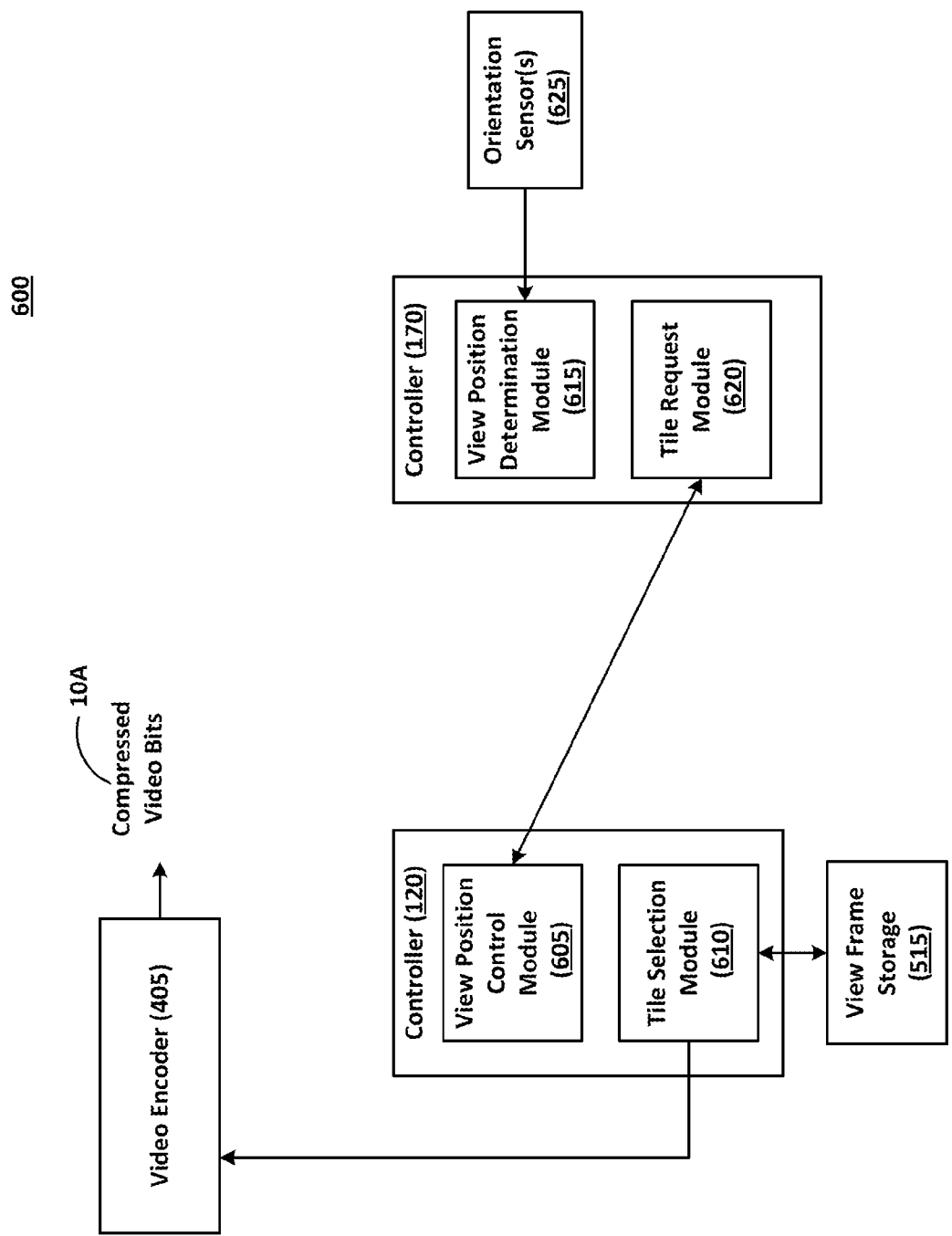
FIG. 6 illustrates a system according to at least one example embodiment.

FIG. 6 illustrates a system 600 according to at least one example embodiment. As shown in FIG. 6, the system 600 includes the controller 120, the controller 170, the encoder 405, the view frame storage 515 and a orientation sensor 625. The controller 120 further includes a view position control module 605 and a tile selection module 610. The controller 170 further includes a view position determination module 615 and a tile request module 620.

According to an example implementation, the orientation sensor 625 detects an orientation (or change in orientation) of a viewers eyes (or head), the view position determination module 615 determines a view, perspective or view perspective based on the detected orientation and the tile request module 620 communicates the view, perspective or view perspective as part of a request for a tile or a plurality of tiles (in addition to the spherical video). According to another example implementation, the orientation sensor 625 detects a orientation (or change in orientation) based on an image panning orientation as rendered on a display. For example, a user may use a mouse, a track pad or a gesture (e.g., on a touch sensitive display) to select, move, drag, expand and/or the like a portion of the spherical video or image as rendered on the display.

The request for the tile may be communicated together with a request for a frame of the spherical video. The request for the tile may be communicated together separate from a request for a frame of the spherical video. For example, the request for the tile may be in response to a changed view, perspective or view perspective resulting in a need to replace previously requested and/or queued tiles.

The view position control module 605 receives and processes the request for the tile. For example, the view position control module 605 can determine a frame and a position of the tile or plurality of tiles in the frame based on the view. Then the view position control module 605 can instruct the tile selection module 610 to select the tile or plurality of tiles. Selecting the tile or plurality of tiles can include passing a parameter to the encoder 405. The parameter can be used by the view selection module 410 during the encoding of the spherical video and/or tile. Alternatively, selecting the tile or plurality of tiles can include selecting the tile or plural of tiles from the view frame storage 515. The selected tile or plurality of tiles can then be passed to the encoder 405 as tile 445. In another example implementation, selecting the tile or plurality of tiles can include passing a parameter to the tile selection module 520 which can use this information to select a tile (or plurality of tiles from the view frame storage 515 as described above with regard to FIG. 5B.

Accordingly, the orientation sensor 625 can be configured to detect an orientation (or change in orientation) of a viewers eyes (or head). For example, the orientation sensor 625 can include an accelerometer in order to detect movement and a gyroscope in order to detect orientation. Alternatively, or in addition to, the orientation sensor 625 can include a camera or infra-red sensor focused on the eyes or head of the viewer in order to determine a orientation of the eyes or head of the viewer. Alternatively, or in addition to, the orientation sensor 625 can determine a portion of the spherical video or image as rendered on the display in order to detect an orientation of the spherical video or image. The orientation sensor 625 can be configured to communicate orientation and change in orientation information to the view position determination module 615.

The view position determination module 615 can be configured to determine a view or perspective view (e.g., a portion of a spherical video that a viewer is currently looking at) in relation to the spherical video. The view, perspective or view perspective can be determined as a position, point or focal point on the spherical video. For example, the view could be a latitude and longitude position on the spherical video. The view, perspective or view perspective can be determined as a side of a cube based on the spherical video. The view (e.g., latitude and longitude position or side) can be communicated to the view position control module 605 using, for example, a Hypertext Transfer Protocol (HTTP).

The view position control module 605 may be configured to determine a view position (e.g., frame and position within the frame) of a tile or plurality of tiles within the spherical video. For example, the view position control module 605 can select a rectangle centered on the view position, point or focal point (e.g., latitude and longitude position or side). The tile selection module 610 can be configured to select the rectangle as a tile or plurality of tiles. The tile selection module 610 can be configured to instruct (e.g., via a parameter or configuration setting) the encoder 405 to encode the selected tile or plurality of tiles and/or the tile selection module 610 can be configured to select the tile or plurality of tiles from the view frame storage 515.

FIGS. 7-10 are flowcharts of methods according to example embodiments. The steps described with regard to FIGS. 7-10 may be performed due to the execution of software code stored in a memory (e.g., at least one memory 110) associated with an apparatus (e.g., as shown in FIG. 1) and executed by at least one processor (e.g., at least one processor 105) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 7-10.

Figure 7:
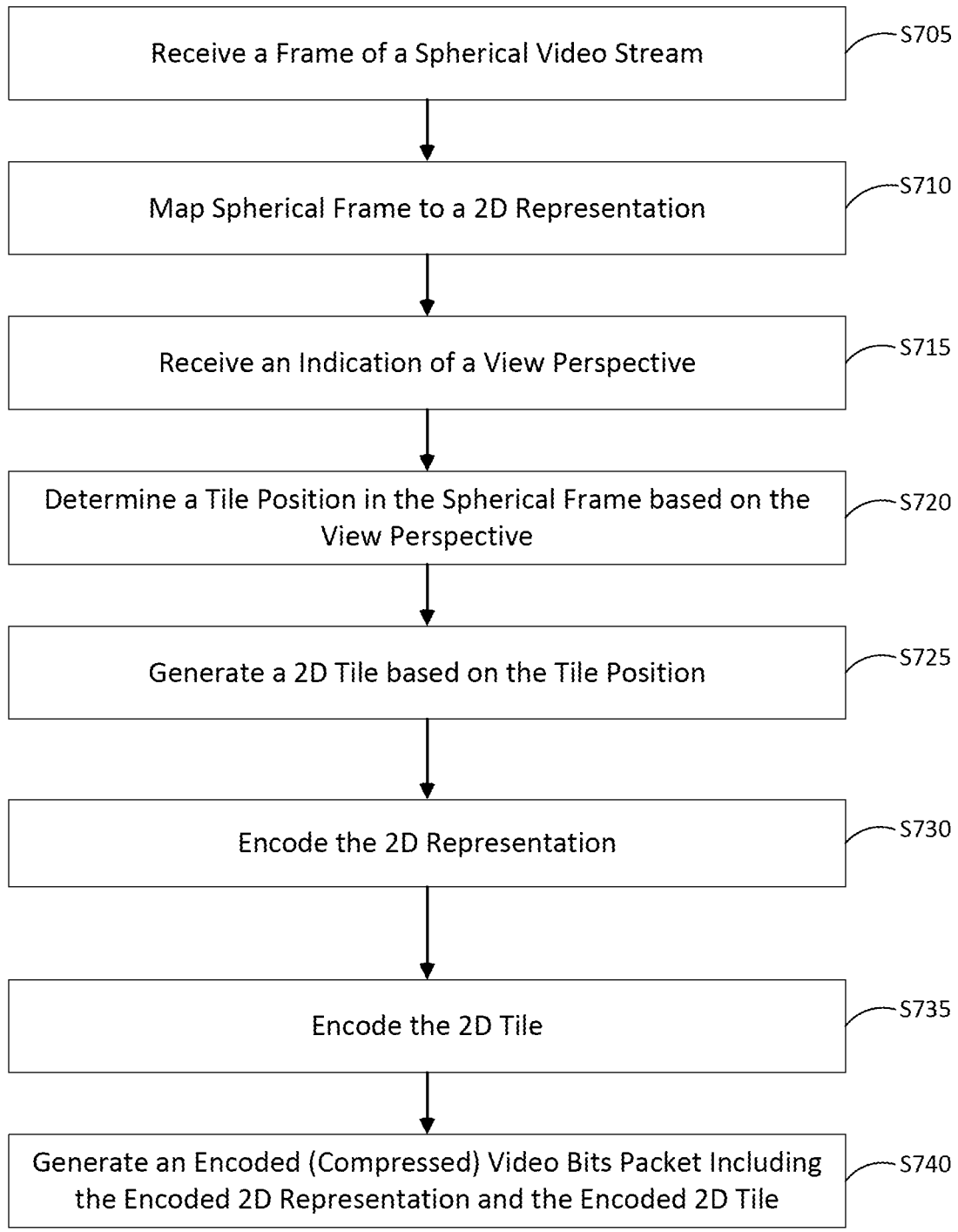
FIGS. 7-9 illustrate methods for encoding streaming spherical video according to at least one example embodiment.

FIG. 7 illustrates a method for encoding streaming spherical video according to at least one example embodiment. As shown in FIG. 7, in step S705 a frame of a spherical video stream is received. For example, a controller (e.g., controller 120) may instruct an encoder (e.g., encoder 125, 405, 505) to receive one or more frames from a video source(s). The video source(s) the may include any video source (e.g., a data storage device, a network, the Internet, a separate computing device, and the like). For example, the video sequence frame(s) may be video frames associated with a spherical video stream (e.g., video stream 5). The video stream may be a real time video stream (e.g., a video conference or a video chat). For example, the video stream may be a previously recorded video (e.g., a movie or a video recorder recording). In addition, the video content may be analog or digital video.

In step S710 the spherical frame is mapped to a 2D representation. For example, mapping a frame (or spherical image) to a 2D representation can include projecting the frame (or spherical image) onto the surface of a cylinder (which is then unwrapped into a rectangle), a square or rectangle. In one example implementation, the projection can be equirectangular. In other words, pixels along a line at the center of the sphere (e.g., an equator) are mapped to an equidistant line between the top and the bottom of the cylinder, square or rectangle. Then, moving away from the line (e.g., up and down from the line), each horizontal line is mapped to the cylinder as a straight line across the middle of the image with the vertical line remaining vertical. As the horizontal line gets closer and closer to the poles of the sphere, the image can be stretched to fit to the cylinder, the square or the rectangle. Other projections are contemplated. For example, a semi-equirectangular projection could be used. A semi-equirectangular may scale the amount of the aforementioned stretch such that the projection does not completely fill the cylinder, the square or the rectangle.

In step S715 an indication of a view perspective is received. The indication of the view perspective can be received from a device executing a playback of the spherical video. In other words, the indication of the view perspective can be received from a device implementing a decoder (e.g., decoder 175, 420) in order for a viewer to view the spherical video. For example, as discussed above, the indication of a view perspective can be based on a portion of a spherical video that a viewer is currently looking at. The indication can be, for example, a point or position (e.g., longitude and latitude) on the sphere, a plurality of points on the sphere, a side of a cube representing the sphere, and/or a plurality of sides of a cube representing the sphere.

In step S720 a tile position in the spherical frame is determined based on the view perspective. For example, if the indication is a point or position on the sphere (as a spherical image or frame), a tile (e.g., a number of pixels, a block and/or a macro-block) can be determined based on point or position. In an example implementation, the tile (at least one tile or a plurality of tiles) position can be a rectangle centered on the point or position.

In step S725 a 2D tile is generated based on the tile position. For example, the 2D tile can be an image including a plurality of pixels. The 2D tile or image can be a portion of the frame of the spherical video. The 2D tile or image can include the plurality of pixels included in the rectangle centered on the point or position.

In an alternative implementation (and/or an additional implementation), the the tile (or plurality of tiles) can be projected using a different projection technique or algorithm than that used to generate the 2D representation of the spherical video frame. For example, some projections can have distortions in certain areas of the frame, so projecting the tile differently than the spherical frame can improve the quality of the final image, and/or use pixels more efficiently. In one example implementation, the spherical image can be rotated before projecting the tile in order to orient the tile in a position that is minimally distorted based on the projection algorithm. In another example implementation, the tile can use (and/or modify) a projection algorithm that is based on the position of the tile. For example, projecting the spherical video frame to the 2D representation of can use an equirectangular projection, whereas projecting the spherical video frame to a representation including a portion to be selected as the tile can use a cubic projection.

In step S730 the 2D representation is encoded. For example, the 2D representation may be transformed (encoded or compressed) into transform coefficients using a configured transform (e.g., a KLT, a SVD, a DCT or an ADST). The encoded transform coefficients or set of residual values for the block can be quantized. For example, the controller 120 may instruct (or invoke) the quantization block 220 to quantize coded motion vectors and the coded residual errors, through any reasonably suitable quantization techniques. In addition, the controller 120 may instruct the entropy coding block 220 to, for example, assign codes to the quantized motion vector codes and residual error codes to match code lengths with the probabilities of the quantized motion vector codes and residual error codes, through any coding technique. Further, encoding the frame including the 2D representation may include decomposing the frame into N×N blocks or macroblocks. For example, the controller 120 may instruct the encoder to decompose each of the video sequence frames into macroblocks having N×N dimensions. For example, the encoder can use a quadtree decomposition technique to decompose the frames including the 2D representation.

In step S735 the 2D tile is encoded. For example, the 2D tile may be transformed (encoded or compressed) into transform coefficients using a configured transform (e.g., a KLT, a SVD, a DCT or an ADST). The encoded transform coefficients or set of residual values for the block can be quantized. For example, the controller 120 may instruct (or invoke) the quantization block 220 to quantize coded motion vectors and the coded residual errors, through any reasonably suitable quantization techniques. In addition, the controller 120 may instruct the entropy coding block 220 to, for example, assign codes to the quantized motion vector codes and residual error codes to match code lengths with the probabilities of the quantized motion vector codes and residual error codes, through any coding technique. Further, encoding the frame including the 2D tile may include decomposing the frame into N×N blocks or macroblocks. For example, the controller 120 may instruct the encoder to decompose each of the video sequence frames into macroblocks having N×N dimensions. For example, the encoder can use a quadtree decomposition technique to decompose the frames including the 2D representation. Further, encoding the 2D tile may include decomposing the 2D tile into N×N blocks or macroblocks. For example, the controller 120 may instruct the encoder to decompose the 2D tile into macroblocks having N×N dimensions. For example, the encoder can use a quadtree decomposition technique to decompose the 2D tile.

In step S740 an encoded (compressed) video bits packet including the encoded 2D representation and the encoded 2D tile is generated. For example, the packet builder 415 can build a packet for transmission. The packet may include compressed video bits 10A. The packet may include the encoded 2D representation of the spherical video frame and the encoded tile (or plurality of tiles). The packet may include a header for transmission. The header may include, amongst other things, the information indicating the mode or scheme use in intra-frame coding by the encoder. The header may include information indicating parameters used to convert a frame of the spherical video frame to a 2D rectangular representation. The header may include information indicating parameters used to achieve the QoS of the encoded 2D rectangular representation and of the encoded tile. As discussed above, the QoS of the encoded 2D rectangular representation and the QoS of the encoded 2D tile can be different. For example, the QoS of the encoded 2D rectangular representation may be lower than the QoS of the encoded 2D tile.

Figure 8:
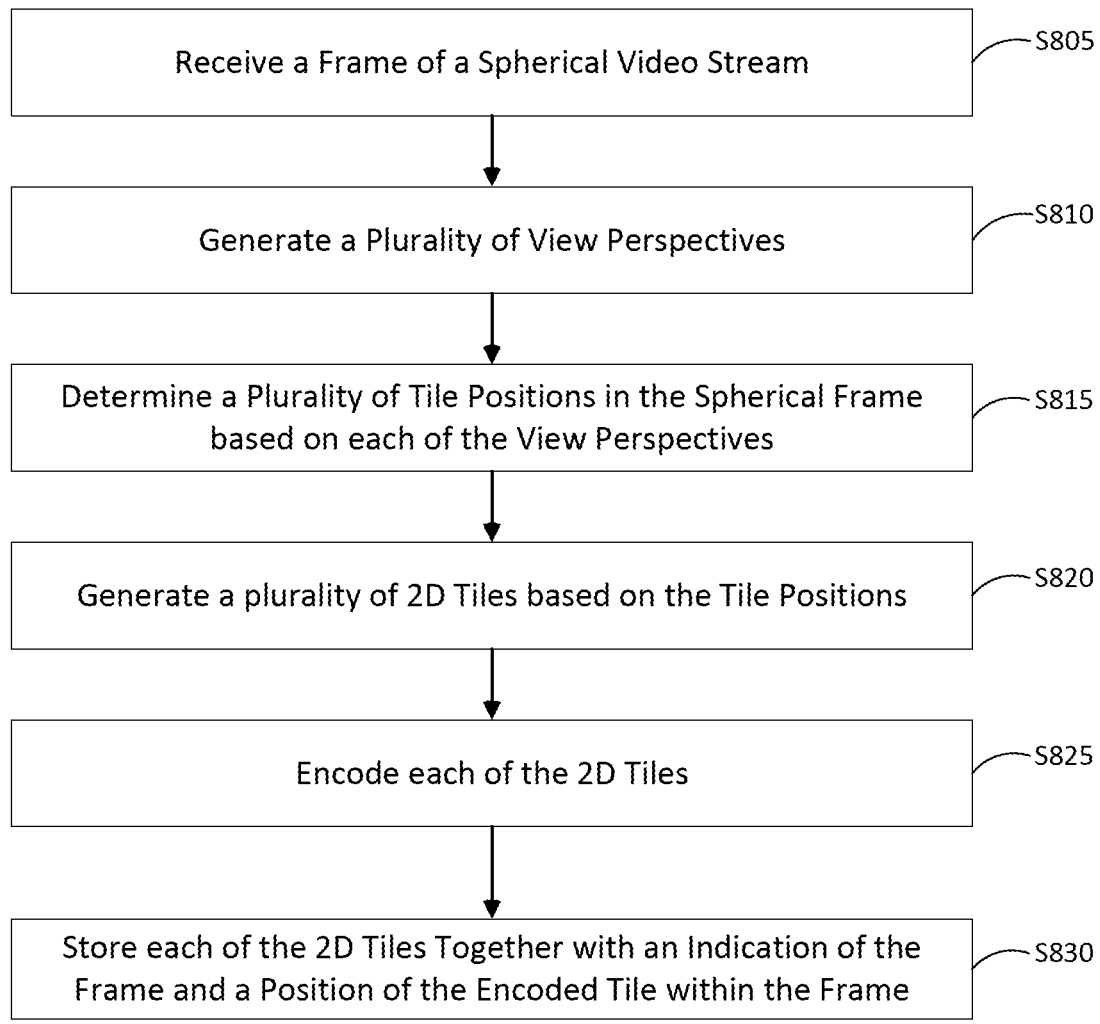

FIG. 8 illustrates another method for encoding streaming spherical video according to at least one example embodiment. As shown in FIG. 8, in step S805 a frame of a spherical video stream is received. For example, a controller (e.g., controller 120) may instruct an encoder (e.g., encoder 125, 405, 505) to receive one or more frames from a video source(s). The video source(s) the may include any video source (e.g., a data storage device, a network, the Internet, a separate computing device, and the like). For example, the video sequence frame(s) may be video frames associated with a spherical video stream (e.g., video stream 5). The video stream may be a real time video stream (e.g., a video conference or a video chat). For example, the video stream may be a previously recorded video (e.g., a movie or a video recorder recording). In addition, the video content may be analog or digital video.

In step S810 a plurality of view perspectives are generated. For example, the view selection module 510 may be configured to select a plurality of views or view perspectives so that the encoder 505 can encode a plurality of tiles. The encoder 505 may be configured to execute a loop where a frame is selected and a portion of the frame is selected as a tile based on a view. The tile is then encoded and stored. The loop continues to cycle through a plurality of views. When a desired number of views, for example, every 5 degrees around the vertical and every 5 degrees around the horizontal of the spherical image, are saved as tiles, a new frame is selected and the process repeats until all frames of the spherical video have a desired number of tiles saved for them.

In step S815 a plurality of tile positions in the spherical frame are determined based on each of the view perspectives. For example, a tile position for each of the plurality of view perspectives can be determined. For example, if the plurality of view perspectives are each based on a point or position on the sphere (as a spherical image or frame), a tile (e.g., a number of pixels, a block and/or a macro-block) can be determined based on point or position. In an example implementation, the tile (at least one tile or a plurality of tiles) position can be a rectangle centered on the point or position.

In step S820 a plurality of 2D tiles are generated based on the tile positions. For example, a 2D tile for each of the plurality of tile positions can be generated (e.g., as a plurality of images). For example, each of the 2D tiles can be an image including a plurality of pixels. The 2D tiles or images can be a portion of the frame of the spherical video. The 2D tiles or images can include the plurality of pixels included in the rectangle centered on the point or position.

In an alternative implementation (and/or an additional implementation), the tile (or plurality of tiles) can be projected using a different projection technique or algorithm than that used to generate the 2D representation of the spherical video frame. For example, some projections can have distortions in certain areas of the frame, so projecting the tile differently than the spherical frame can improve the quality of the final image, and/or use pixels more efficiently. In one example implementation, the spherical image can be rotated before projecting the tile in order to orient the tile in a position that is minimally distorted based on the projection algorithm. In another example implementation, the tile can use (and/or modify) a projection algorithm that is based on the position of the tile. For example, projecting the spherical video frame to the 2D representation of can use an equirectangular projection, whereas projecting the spherical video frame to a representation including a portion to be selected as the tile can use a cubic projection.

In step S825 each of the 2D tiles are encoded. For example, each of the plurality of 2D tiles may be transformed (encoded or compressed) into transform coefficients using a configured transform (e.g., a KLT, a SVD, a DCT or an ADST). The encoded transform coefficients or set of residual values for the block can be quantized. For example, the controller 120 may instruct (or invoke) the quantization block 220 to quantize coded motion vectors and the coded residual errors, through any reasonably suitable quantization techniques. In addition, the controller 120 may instruct the entropy coding block 220 to, for example, assign codes to the quantized motion vector codes and residual error codes to match code lengths with the probabilities of the quantized motion vector codes and residual error codes, through any coding technique. Further, encoding the frame including the 2D tile may include decomposing the frame into N×N blocks or macroblocks. For example, the controller 120 may instruct the encoder to decompose each of the video sequence frames into macroblocks having N×N dimensions. For example, the encoder can use a quadtree decomposition technique to decompose the frames including the 2D representation. Further, encoding the 2D tile may include decomposing the 2D tile into N×N blocks or macroblocks. For example, the controller 120 may instruct the encoder to decompose the 2D tile into macroblocks having N×N dimensions. For example, the encoder can use a quadtree decomposition technique to decompose the 2D tile.

In step S830 each of the 2D tiles are stored together with an indication of the frame and a position of the encoded tile within the frame. For example, each of the plurality of encoded 2Dtiles may be stored in view frame storage 515. Each of the plurality of tiles may be indexed such that each of the plurality of tiles that are stored with a reference to the frame (e.g., a time dependence) and a view (e.g., a view dependence). Accordingly, each of the plurality of tiles so that they are time and view, perspective or view perspective dependent and can be recalled based on the time and view dependence.

Figure 9:
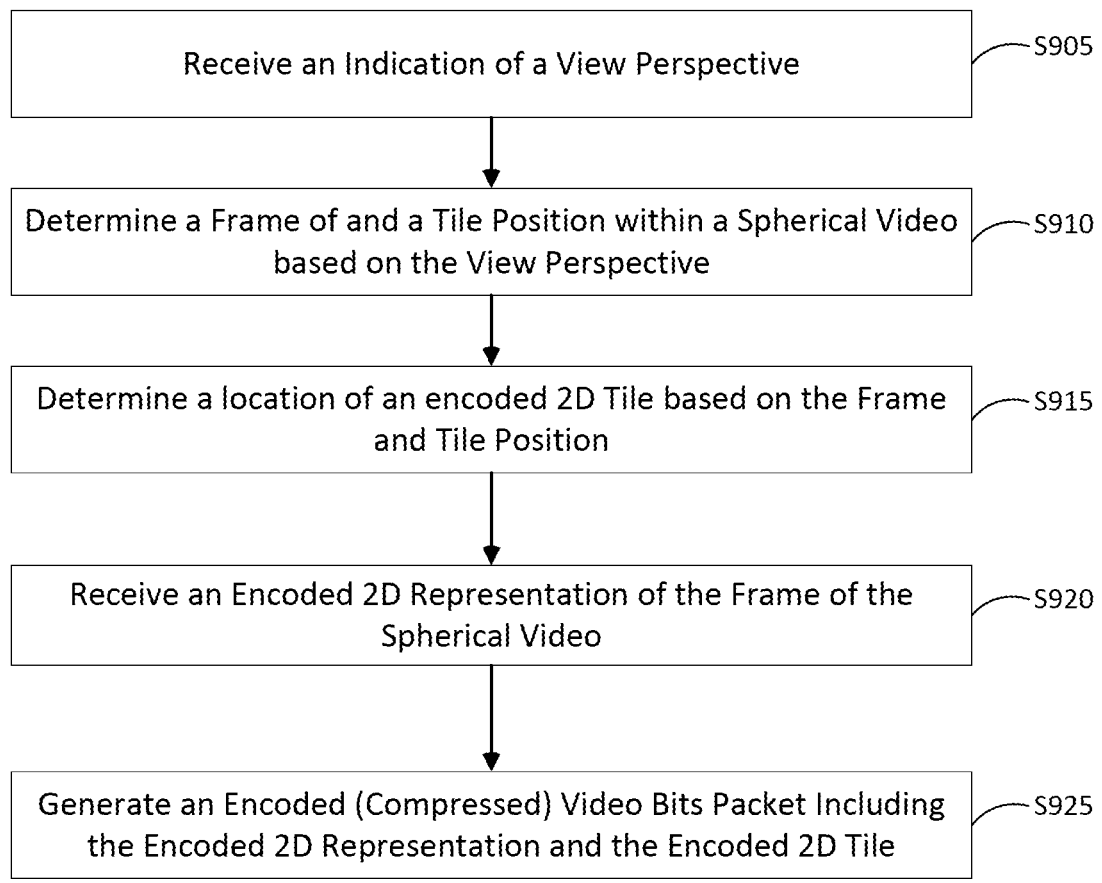

FIG. 9 illustrates a method for encoding streaming spherical video according to at least one example embodiment. As shown in FIG. 9, in step S905 an indication of a view perspective is received. For example, as discussed above, a tile can be requested by a device including a decoder. The tile request can include information based on a perspective or view perspective related to an orientation, a position, point or focal point of a viewer on a spherical video. For example, the view perspective could be a latitude and longitude position on the spherical video. The view, perspective or view perspective can be determined as a side of a cube based on the spherical video. The indication of a view perspective can also include spherical video information. In an example implementation, the indication of a view perspective can include information about a frame (e.g., frame sequence) associated with the view perspective. For example, the view (e.g., latitude and longitude position or side) can be communicated from the view position determination module 615 to the view position control module 605 using, for example, a Hypertext Transfer Protocol (HTTP).

In step S910 a frame of and a tile position within a spherical video is determined based on the view perspective. For example, the aforementioned information about the frame can be information indicating the frame is the current frame to be encoded or a previously encoded frame (e.g., as a frame sequence or sequence number). Accordingly, the frame can be determined as the current frame to be encoded or the previously encoded frame. Then, the tile position can be based on the view or view perspective within the determined frame.

In step S915 a location of an encoded 2D tile is determined based on the frame and tile position. For example, using the frame and tile position, an encoded 2D tile can be looked-up or searched for in the view frame storage 515. Upon finding the 2D tile in the view frame storage 515, the 2D tile can be retrieved or read from the view frame storage 515.

In step S920 receive an encoded 2D representation of the frame of the spherical video is received. For example, an output of encoder 125 can be received. The output of encoder 125 can be encoded video bits representing the 2D representation of the frame of the spherical video.

In step S925 an encoded (compressed) video bits packet including the encoded 2D representation and the encoded 2D tile is generated. For example, the packet builder 415 may build a packet for transmission. The packet may include compressed video bits 10A. The packet may include the encoded 2D representation of the spherical video frame and the encoded tile (or plurality of tiles). The packet may include a header for transmission. The header may include, amongst other things, the information indicating the mode or scheme use in intra-frame coding by the encoder. The header may include information indicating parameters used to convert a frame of the spherical video frame to a 2D rectangular representation. The header may include information indicating parameters used to achieve the QoS of the encoded 2D rectangular representation and of the encoded tile. As discussed above, the QoS of the encoded 2D rectangular representation and the QoS of the encoded 2D tile can be different. For example, the QoS of the encoded 2D rectangular representation may be lower than the QoS of the encoded 2D tile.

In an alternative implementation of the steps associated with FIGS. 7-9, in an initialization process, in order to increase the speed of an initial stream of video, only the encoded 2D tiles are encoded and streamed. Then after the initial stream, the encoded 2D representation of the spherical is added to the packet including the encoded 2D tile as previously described.

In another alternative implementation, the QoS of the encoded 2D rectangular representation and the QoS of the encoded 2D tile may be dynamically adjusted based on, for example, the bandwidth available to the video stream. Accordingly, in some implementations the QoS of the encoded 2D rectangular representation may be approximately the same as the QoS of the encoded 2D tile should a threshold amount of, for example, bandwidth available. Decoding may be likewise implemented.

Figure 10:
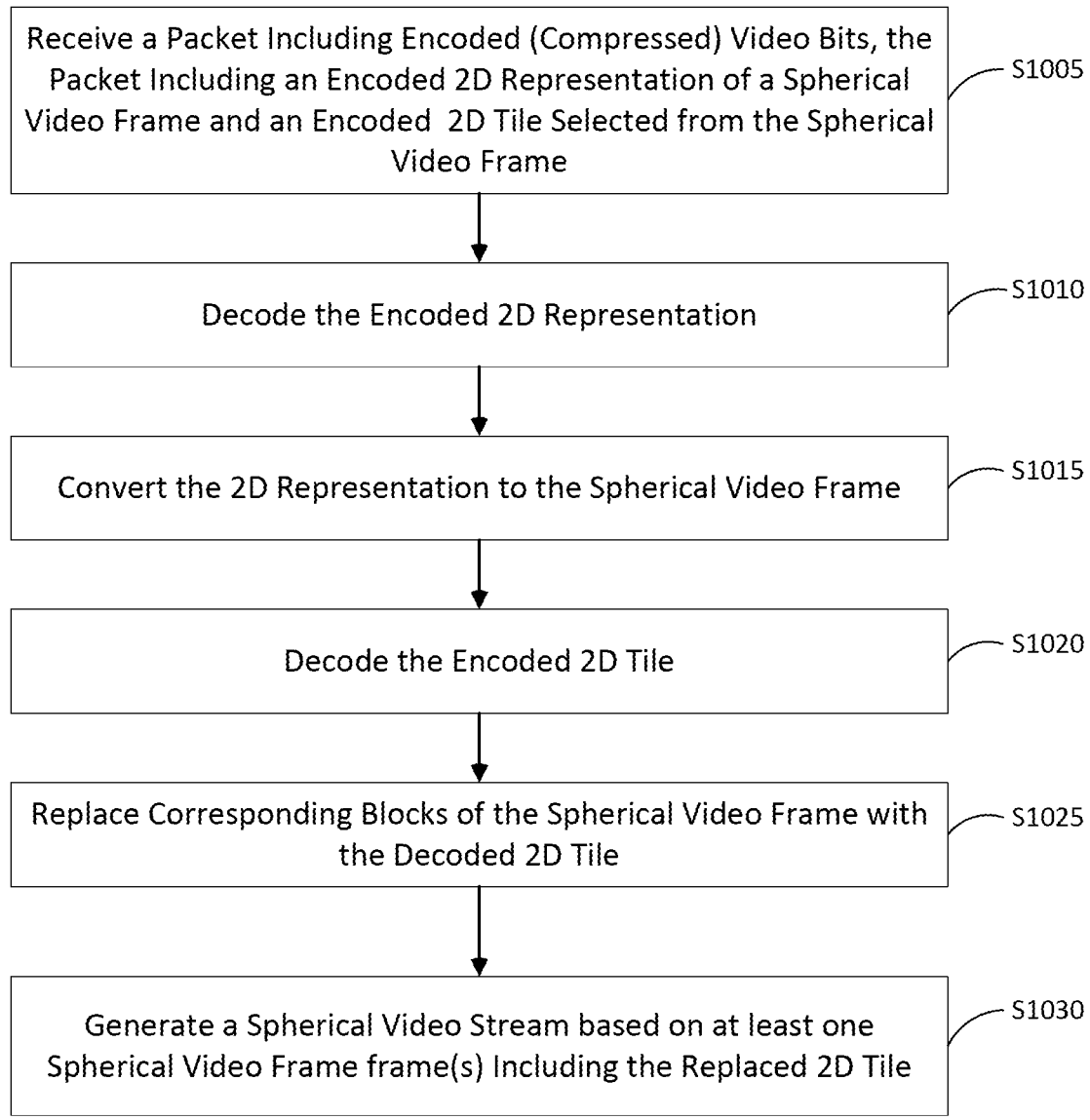
FIG. 10 illustrates a method for decoding streaming spherical video according to at least one example embodiment.

FIG. 10 illustrates a method for decoding streaming spherical video according to at least one example embodiment. As shown in FIG. 10, in step S1005 a packet including encoded (compressed) video bits is received, the packet includes an encoded 2D representation of a spherical video frame and an encoded 2D tile selected from the spherical video frame. For example, the packet may include compressed video bits 10A. The packet may include the encoded 2D representation of the spherical video frame and the encoded tile (or plurality of tiles). The packet may include a header for transmission. The header may include, amongst other things, the information indicating the mode or scheme use in intra-frame coding by the encoder. The header may include information indicating parameters used to convert a frame of the spherical video frame to a 2D rectangular representation. The header may include information indicating parameters used to achieve the QoS of the encoded 2D rectangular representation and of the encoded tile. As discussed above, the QoS of the encoded 2D rectangular representation and the QoS of the encoded 2D tile can be different. For example, the QoS of the encoded 2D rectangular representation may be lower than the QoS of the encoded 2D tile.

In step S1010 the encoded 2D representation is decoded. For example, a video decoder (e.g., decoder 175) entropy decodes the encoded 2D representation. For example, the compressed video bits can be decoded by entropy decoding using, for example, Context Adaptive Binary Arithmetic Decoding to produce a set of quantized transform coefficients. The video decoder de-quantizes the transform coefficients given by the entropy decoded bits. For example, the entropy decoded video bits can be dequantized by mapping values within a relatively small range to values in a relatively large range (e.g. opposite of the quantization mapping described above). Further, the video decoder inverse transforms the video bits using an indicated (e.g., in the header) transform (e.g., a KLT, a SVD, a DCT or an ADST). The video decoder can filter the reconstructed pixel in the video frame. For example, a loop filter can be applied to the reconstructed block to reduce blocking artifacts. For example, a deblocking filter can be applied to the reconstructed block to reduce blocking distortion.

In step S1015 convert the 2D representation is converted to the spherical video frame. For example, the decoded 2D representation can be converted to a spherical video frame (or image). For example, the 2D representation can be converted using the inverse of the technique described above with regard to mapping a spherical frame (or image) to a 2D representation of the spherical frame (or image).

In step S1020 the encoded 2D tile is decoded. For example, a video decoder (e.g., decoder 420) entropy decodes the encoded 2D tile. For example, the compressed video bits can be decoded by entropy decoding using, for example, Context Adaptive Binary Arithmetic Decoding to produce a set of quantized transform coefficients. The video decoder de-quantizes the transform coefficients given by the entropy decoded bits. For example, the entropy decoded video bits can be de-quantized by mapping values within a relatively small range to values in a relatively large range (e.g. opposite of the quantization mapping described above). Further, the video decoder inverse transforms the video bits using an indicated (e.g., in the header) transform (e.g., a KLT, a SVD, a DCT or an ADST). The video decoder can filter the reconstructed pixel in the video frame. For example, a loop filter can be applied to the reconstructed block to reduce blocking artifacts. For example, a deblocking filter can be applied to the reconstructed block to reduce blocking distortion.

In step S1025 corresponding blocks of the spherical video frame are replaced with the decoded 2D tile. For example, tile replacement module 430 may be configured to replace the corresponding blocks (or pixels or macro-block) in the spherical video frame with the pixels of the decoded tile. The replacement may be a pixel by pixel or block by block replacement of pixels or blocks in the decoded and converted spherical video frame with pixels or blocks of the decoded 2D tile. In other words, a portion of data stored in a memory (e.g., a video queue) associated with the spherical video frame is replaced by data representing pixels or blocks of the 2D tile. As discussed above, the 2D tile can be encoded with a higher QoS than the 2D representation of the spherical video frame. Accordingly the resultant spherical video can have higher quality image (or portion of the spherical video) in the view, perspective or view perspective of the watcher of the spherical video as compared to the image(s) (or portion of the spherical video) that is not in (or outside) the view, perspective or view perspective of the watcher.

In step S1030 a spherical video stream is generated based on at least one spherical video frame frame(s) including the replaced 2D tile. For example, at least one video frame of reconstructed converted pixels of the spherical video, including the portions replaced by the 2D tile, may be organized in a sequence to form a spherical video stream. As discussed above, the tile was encoded with a higher QoS than the 2D rectangular representation of the spherical video frame. Accordingly, the generating of the spherical video stream including the replacing with the 2D tile may result in the visible portion of the spherical video stream being of a higher quality than the non-visible portion of the spherical video stream during a playback of the spherical video stream.

As will be appreciated, the system 100 and 150 illustrated in FIGS. 1A and 1B may be implemented as an element of and/or an extension of the generic computer device 1100 and/or the generic mobile computer device 1150 described below with regard to FIG. 11. Alternatively, or in addition to, the system 100 and 150 illustrated in FIGS. 1A and 1B may be implemented in a separate system from the generic computer device 1100 and/or the generic mobile computer device 1150 having some or all of the features described below with regard to the generic computer device 1100 and/or the generic mobile computer device 1150.

Figure 11:
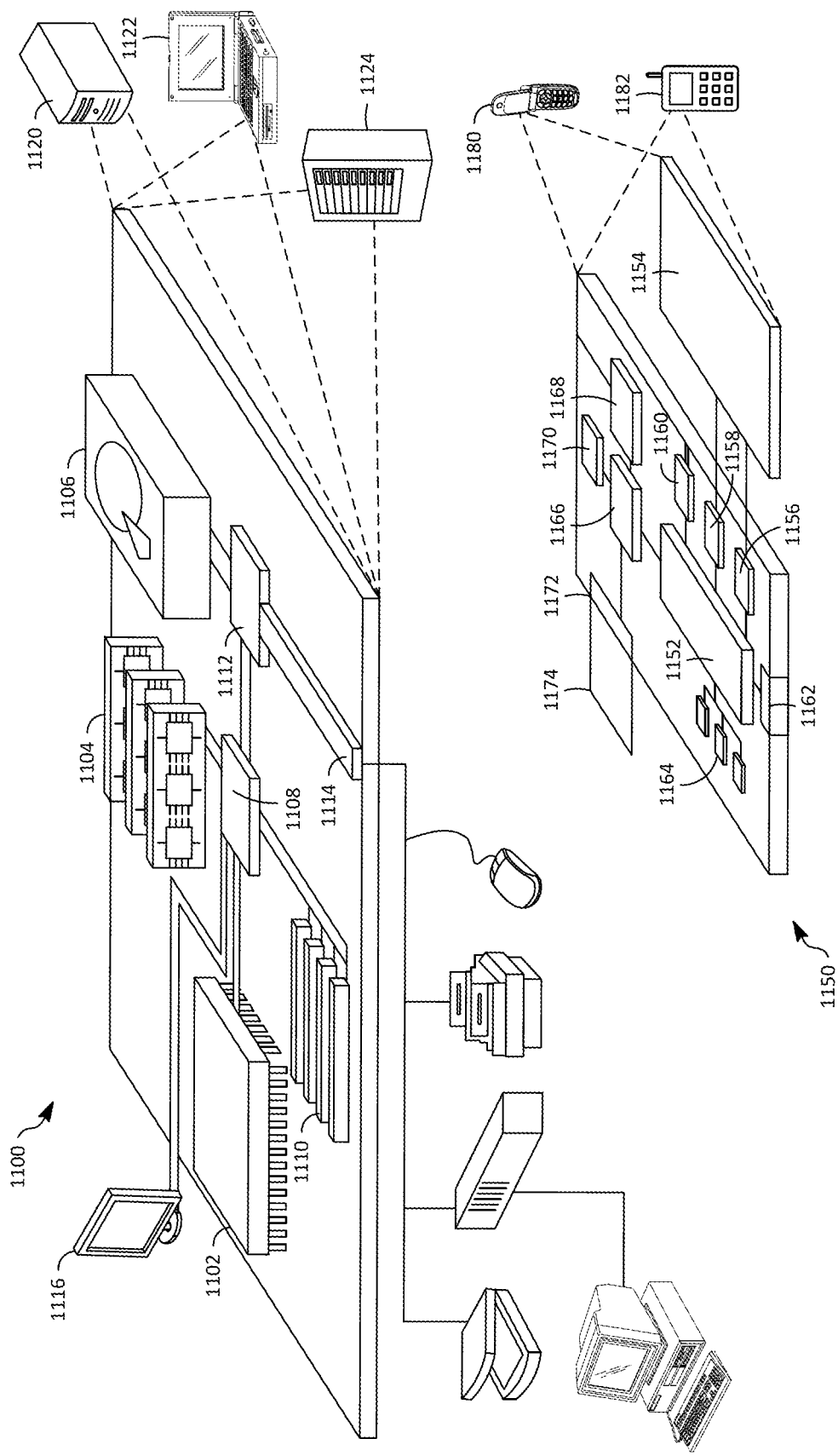
FIG. 11 is a schematic block diagram of a computer device and a mobile computer device that can be used to implement the techniques described herein.

FIG. 11 is a schematic block diagram of a computer device and a mobile computer device that can be used to implement the techniques described herein. FIG. 11 is an example of a generic computer device 1100 and a generic mobile computer device 1150, which may be used with the techniques described here. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method, comprising:
   determining a tile position in a frame of a spherical video based on a view perspective, the view perspective being based on a viewable portion of the spherical video in response to triggering a playback of the spherical video;
   selecting a two dimensional tile from the frame of the spherical video as a frame to be encoded based on a position on the spherical video, the position on the spherical video being based on the view perspective;
   rotating the frame of the spherical video, based on a projection algorithm, to orient the tile position from a first position having a first distortion to a second position having a second distortion, the second distortion being less than the first distortion;
   after rotating the frame of the spherical video based on the projection algorithm:
      encoding the two dimensional tile at a first quality;
      mapping the frame of the spherical video to a two dimensional representation of the spherical video based on a two dimensional projection algorithm;
      generating at least one residual for the two dimensional representation of the spherical video by subtracting a template from un-encoded pixels of the two dimensional representation of the spherical video to be encoded;
      encoding the at least one residual by applying a transform to the at least one residual;
      quantizing transform coefficients associated with the encoded at least one residual; and
      entropy encoding the quantized transform coefficients as at least one compressed video bit, wherein the generating of the at least one residual, the encoding of the at least one residual, the quantizing of the transform coefficients, and the quantizing of the transform coefficients includes setting of at least one parameter based on a second quality, the first quality being a higher quality as compared to the second quality.

2. The method of claim 1, further comprising transmitting the encoded two dimensional tile and the encoded two dimensional representation as a streaming spherical video.

3. The method of claim 1, further comprising receiving an indication of the view perspective from a device executing a playback of the spherical video.

4. The method of claim 1, further comprising:
   transmitting the encoded two dimensional tile over a first time period while streaming the spherical video; and
   transmitting the encoded two dimensional tile and the encoded two dimensional representation over a first time period while streaming the spherical video.

5. The method of claim 1, wherein the selecting of the portion of the frame of the spherical video as the two dimensional tile and the encoding of the two dimensional tile includes:
   selecting the two dimensional tile from a datastore of previously encoded tiles; and
   reading the two dimensional tile from the datastore.

6. The method of claim 1, wherein the encoding of the two dimensional tile includes:
   generating at least one residual for the two dimensional tile by subtracting a template from un-encoded pixels of a block of the two dimensional tile to be encoded;
   encoding the at least one residual by applying a transform to a residual block including the at least one residual;
   quantizing transform coefficients associated with the encoded at least one residual; and
   entropy encoding the quantized transform coefficients as at least one compressed video bit, wherein at least one of the generating of the at least one residual, the encoding of the at least one residual, the quantizing of the transform coefficients, and the quantizing of the transform coefficients includes setting of at least one parameter based on the first quality.

7. A non-transitory computer-readable storage medium having stored thereon computer executable program code which, when executed on a computer system, causes the computer system to perform steps comprising:
   determining a tile position in a frame of a spherical video based on a view perspective, the view perspective being based on a viewable portion of the spherical video in response to triggering a playback of the spherical video;
   selecting a two dimensional tile from the frame of the spherical video as a frame to be encoded based on a position on the spherical video, the position on the spherical video being based on the view perspective;
   rotating the frame of the spherical video, based on a projection algorithm, to orient the tile position from a first position having a first distortion to a second position having a second distortion, the second distortion being less than the first distortion;
   after rotating the frame of the spherical video based on the projection algorithm:
      encoding the two dimensional tile at a first quality;
      mapping the frame of the spherical video to a two dimensional representation of the spherical video based on a two dimensional projection algorithm;
      generating at least one residual for the two dimensional representation of the spherical video by subtracting a template from un-encoded pixels of the two dimensional representation of the spherical video to be encoded;
      encoding the at least one residual by applying a transform to the at least one residual;
      quantizing transform coefficients associated with the encoded at least one residual; and
      entropy encoding the quantized transform coefficients as at least one compressed video bit, wherein the generating of the at least one residual, the encoding of the at least one residual, the quantizing of the transform coefficients, and the quantizing of the transform coefficients includes setting of at least one parameter based on a second quality, the first quality being a higher quality as compared to the second quality.

8. The non-transitory computer-readable storage medium of claim 7, wherein the selecting of the portion of the frame of the spherical video as the two dimensional tile and the encoding of the two dimensional tile includes:
   selecting the two dimensional tile from a datastore of previously encoded tiles; and
   reading the two dimensional tile from the two dimensional tile from the datastore.

\* \* \* \* \*